United States Patent
Kobayashi et al.

(10) Patent No.: US 12,359,695 B2
(45) Date of Patent: Jul. 15, 2025

(54) FIXED-TYPE CONSTANT VELOCITY UNIVERSAL JOINT

(71) Applicant: NTN Corporation, Osaka (JP)

(72) Inventors: Tomoshige Kobayashi, Shizuoka (JP); Masazumi Kobayashi, Shizuoka (JP)

(73) Assignee: NTN CORPORATION, Osaka (JP)

(*) Notice: Subject to any disclaimer, the term of this patent is extended or adjusted under 35 U.S.C. 154(b) by 457 days.

(21) Appl. No.: 17/788,032

(22) PCT Filed: Dec. 22, 2020

(86) PCT No.: PCT/JP2020/047989
§ 371 (c)(1),
(2) Date: Jun. 22, 2022

(87) PCT Pub. No.: WO2021/132253
PCT Pub. Date: Jul. 1, 2021

(65) Prior Publication Data
US 2023/0043113 A1    Feb. 9, 2023

(30) Foreign Application Priority Data

Dec. 26, 2019  (JP) ................... 2019-236172
Dec. 10, 2020  (JP) ................... 2020-205000

(51) Int. Cl.
*F16D 3/2245*    (2011.01)
*F16D 3/84*       (2006.01)
*F16D 3/223*      (2011.01)

(52) U.S. Cl.
CPC .......... *F16D 3/2245* (2013.01); *F16D 3/845* (2013.01); *F16D 2003/22309* (2013.01); *F16D 2003/2232* (2013.01); *F16D 2250/0053* (2013.01); *Y10S 464/906* (2013.01)

(58) Field of Classification Search
CPC ................. F16D 3/2245; F16D 3/845; F16D 2003/22309; F16D 2003/2232; F16D 2250/0053; Y10S 464/906
USPC ........................................ 464/145
See application file for complete search history.

(56) References Cited

U.S. PATENT DOCUMENTS 6,120,382 A      9/2000 Sone et al.
8,398,495 B2 *   3/2013 Yamaguchi ............. F16D 1/101
                                                    464/160

(Continued)

FOREIGN PATENT DOCUMENTS

CN    101493119    7/2009
CN    104704253    6/2015

(Continued)

OTHER PUBLICATIONS

Universal Joint and Driveshaft Design Manual, AE-7, Society of Automotive Engineers, Inc., Warrendale, PA, Section 3.2.8, pp. 145-150, TJ1079.S62. (Year: 1979).*

(Continued)

*Primary Examiner* — Greg Binda
(74) *Attorney, Agent, or Firm* — Wenderoth, Lind & Ponack, L.L.P.

(57) ABSTRACT

A fixed type constant velocity universal joint includes an outer joint member, an inner joint member, eight balls, and a cage. The fixed type constant velocity universal joint has a ball retaining mechanism. A ratio of an axial length from a joint center to an opening-side end surface of the outer joint member to a diameter of each of the balls is within a range of 0.35 to 0.52. A ratio of a width of the cage to the diameter of each of the balls is within a range of 1.63 to 1.80. The ball retaining mechanism includes a cylindrical shaft portion at an end portion of a shaft and an angle restriction stopper surface of the outer joint member.

8 Claims, 10 Drawing Sheets

(56) References Cited

U.S. PATENT DOCUMENTS

| | | | |
|---|---|---|---|
| 10,962,063 B2* | 3/2021 | Asano | F16D 3/223 |
| 2015/0240878 A1 | 8/2015 | Yamazaki et al. | |
| 2017/0321758 A1 | 11/2017 | Kato | |
| 2018/0313406 A1 | 11/2018 | Asano et al. | |
| 2020/0018356 A1 | 1/2020 | Kobayashi et al. | |
| 2020/0063802 A1 | 2/2020 | Sugiyama | |

FOREIGN PATENT DOCUMENTS

| | | |
|---|---|---|
| CN | 110291300 | 9/2019 |
| CN | 110446873 | 11/2019 |
| JP | 3-113124 | 5/1991 |
| JP | 9-317784 | 12/1997 |
| JP | 2003-307235 | 10/2003 |
| JP | 2005-180641 | 7/2005 |
| JP | 2010-185541 | 8/2010 |
| JP | 2016-109145 | 6/2016 |
| JP | 2017-82886 | 5/2017 |
| JP | 2018-155320 | 10/2018 |
| WO | 2021/132253 | 7/2021 |

OTHER PUBLICATIONS

International Search Report issued Mar. 2, 2021 in corresponding International Application No. PCT/JP2020/047989.
International Preliminary Report on Patentability and Written Opinion of the International Searching Authority issued Jun. 28, 2022 in International (PCT) Application No. PCT/JP2020/047989.

* cited by examiner

FIXED-TYPE CONSTANT VELOCITY UNIVERSAL JOINT

TECHNICAL FIELD

This invention relates to a lightweight and compact fixed type constant velocity universal joint having a ball retaining mechanism.

BACKGROUND ART

In general, a drive shaft of an automobile includes an outboard-side constant velocity universal joint mounted to a wheel, an inboard-side constant velocity universal joint mounted to a differential gear, and an intermediate shaft coupling both the constant velocity universal joints to each other. Typically, as the outboard-side constant velocity universal joint, there is used a fixed type constant velocity universal joint that can form a large operating angle but is not displaced in an axial direction thereof, and as the inboard-side constant velocity universal joint, there is used a plunging type constant velocity universal joint that has a relatively small maximum operating angle and can be displaced in the axial direction while forming the operating angle.

Examples of the drive shaft of an automobile include a front-wheel drive shaft mounted to a front wheel, and a rear-wheel drive shaft mounted to a rear wheel. As an outboard-side (wheel-side) fixed type constant velocity universal joint for a front-wheel drive shaft, a constant velocity universal joint having a large maximum operating angle (for example, 45° or more) is used because the constant velocity universal joint is mounted to a front wheel being a steered wheel. Meanwhile, an outboard-side fixed type constant velocity universal joint for a rear-wheel drive shaft is mounted to a rear wheel that is not steered, and hence may have a maximum operating angle smaller than that of the fixed type constant velocity universal joint for the front-wheel drive shaft.

The rear-wheel drive shaft has a maximum operating angle as small as 20° or less. Thus, there has been proposed a fixed type constant velocity universal joint to be used exclusively for a rear-wheel drive shaft, which is remarkably reduced in weight and size (Patent Document 1). Such fixed type constant velocity universal joint has been achieved with a Rzeppa type constant velocity universal joint using eight balls, in which track grooves of an outer joint member are shortened and internal specifications are set based on a design concept different from those of the related art.

Incidentally, in the fixed type constant velocity universal joint to be used for a front-wheel drive shaft, balls are incorporated into track grooves of an outer joint member at a large angle. Thus, when an opening-side end portion of the outer joint member interferes with an intermediate shaft at an operating angle smaller than an operating angle at which the balls may generally fall out of the track grooves of the outer joint member, the opening-side end portion and the intermediate shaft function as an angle stopper to thereby stop the balls from falling out.

When the lengths of the track grooves of the outer joint member of the fixed type constant velocity universal joint to be used for a rear-wheel drive shaft are reduced, at the time of conveyance of the drive shaft or mounting of the drive shaft into a vehicle after the fixed type constant velocity universal joint is mounted to complete the drive shaft, the fixed type constant velocity universal joint may form an excessively large operating angle, which may cause the balls to fall out of the track grooves. As a measure for preventing the balls from falling out, there has been proposed a method of causing interference between a distal end portion of the intermediate shaft and a bottom of a cup of the outer joint member (Patent Documents 2 to 4).

PRIOR ART DOCUMENTS

Patent Documents

Patent Document 1: JP 2018-155320 A
Patent Document 2: JP H3-113124 A
Patent Document 3: JP 2005-180641 A
Patent Document 4: JP 2010-185541 A

SUMMERY OF THE INVENTION

Problems to be Solved by the Invention

In Patent Document 1, there is proposed the basic configuration of the fixed type constant velocity universal joint to be used for a rear-wheel drive shaft, in which the track grooves of the outer joint member are shortened and the internal specifications are set based on the design concept different from those of the related art. However, no focus is given to preventing the balls from falling out.

In Patent Document 2, basically, in order to allow a fixed type constant velocity universal joint for a front-wheel drive shaft to be used for a rear-wheel drive shaft, an operating angle is restricted. A shaft end portion of an intermediate shaft becomes undesirably longer, leading to an increase in weight of the intermediate shaft. An effect obtained by reduction in weight may diminish even when a length of a cup of an outer joint member is reduced.

In Patent Document 3, an outer joint member which interferes with a shaft end portion of an intermediate shaft has a bottom portion formed as a separate member, which may result in an increase in cost. Further, the shaft end portion of the intermediate shaft becomes undesirably longer. In Patent Document 4, a bottom portion of an outer joint member is formed into a tapered shape. For use as an angle restriction stopper, in order to control a use angle of a constant velocity universal joint and prevention of balls from falling out, it is necessary to control a taper angle and a taper length, and other elements such as a shape of the bottom portion and a length of a distal end portion of an intermediate shaft. In this case, a restriction angle varies depending on a taper position and the taper angle. Thus, cost increases for control of dimensions.

A ball retaining mechanism described in each of Patent Documents 2 to 4, in which the intermediate shaft and the bottom portion of the outer joint member are caused to interfere with each other to function as the angle restriction stopper, affects a shape of a stem section of the outer joint member, which is used to mount the fixed type constant velocity universal joint to a wheel bearing device. A thickness between a root of the stem section and the bottom portion of the outer joint member and a thickness between a shoulder portion and the bottom portion of the outer joint member, which may affect strength, are required to be set to appropriate dimensions. When a cavity portion in the bottom portion of the outer joint member is set longer in an axial direction and a radial direction, a distance between a position of a joint center and a position of a back face corresponding to a root of the stem section increases, leading to an increase in weight of the fixed type constant velocity universal joint. As described above, the constant velocity universal joints having the ball retaining mechanism disclosed in each of Patent Documents 2 to 4 still have problems to be solved in terms of cost and reduction in weight and size.

In view of the problems described above, the present invention has an object to reduce a fixed type constant velocity universal joint having a ball retaining mechanism in weight and size as a whole joint at low cost.

Solutions to the Problems

As a result of various examinations conducted to achieve the above-mentioned object, the inventors of the present invention have found essential internal specifications among various internal specifications of a lightweight and compact fixed type constant velocity universal joint to be exclusively used for a rear-wheel drive shaft. The present invention has been made based on a novel idea that the internal specifications, an inclination allowing space for a cage, which is configured to ensure a ball incorporation angle, and dimensions and arrangements of a ball retaining mechanism are combined.

As a technical measure for achieving the above-mentioned object, according to the present invention, there is provided a fixed type constant velocity universal joint, comprising: an outer joint member including a spherical inner peripheral surface having eight curved track grooves extending in an axial direction, the outer joint member having an opening side and a deep side being separate from each other in the axial direction; an inner joint member including a spherical outer peripheral surface having eight curved track grooves extending in the axial direction; eight balls arranged between the track grooves of the outer joint member and the corresponding track grooves of the inner joint member; and a cage, which has eight pockets configured to receive the balls in a one-by-one manner, and includes a spherical outer peripheral surface and a spherical inner peripheral surface that are held in slide contact with the spherical inner peripheral surface of the outer joint member and the spherical outer peripheral surface of the inner joint member, respectively, wherein a curvature center of the curved track grooves of the outer joint member and a curvature center of the curved track grooves of the inner joint member are offset to opposite sides in the axial direction with respect to a joint center by an equal distance, wherein the fixed type constant velocity universal joint comprises a shaft coupled to the inner joint member so as to be able to transmit power, wherein the fixed type constant velocity universal joint has a lightweight and compact configuration having a ball retaining mechanism, wherein, for the lightweight and compact configuration, a ratio $W1_o/D_{BALL}$ of an axial length $W1_o$ from the joint center to an opening-side end surface of the outer joint member to a diameter $D_{BALL}$ of each of the balls is set to fall within a range of from 0.35 to 0.52, wherein a ratio $W_C/D_{BALL}$ of a width $W_C$ of the cage to the diameter $D_{BALL}$ of each of the balls is set to fall within a range of from 1.63 to 1.80, wherein an inclination allowing space for the cage, which is configured to ensure a ball incorporation angle, is defined by a deep-side bottom portion of the outer joint member, wherein the ball retaining mechanism comprises a cylindrical shaft portion formed at an end portion of the shaft and an angle restriction stopper surface at an inner periphery of a recessed portion formed in the deep-side bottom portion, and the cylindrical shaft portion and the angle restriction stopper surface interfere with each other at an angle smaller than the ball incorporation angle and larger than a maximum operating angle when the joint is in use, and wherein an end surface corner portion of the cylindrical shaft portion of the shaft is positioned within a range surrounded by a circle $C_C$ containing the spherical outer peripheral surface of the cage and a circle $C_T$ containing groove bottoms of the curved track grooves of the outer joint member on the deep side of the outer joint member in a longitudinal cross section containing a joint axis under a state in which an operating angle is 0°.

The above-mentioned configuration reduces the fixed type constant velocity universal joint having the ball retaining mechanism in weight and size as a whole joint at low cost. Remarkable reduction in cost, weight, and size can be achieved by using the fixed type constant velocity universal joint for a rear-wheel drive shaft of an automobile. In addition, the balls can be prevented from falling out at the time of conveyance of the rear-wheel drive shaft or mounting of the rear-wheel drive shaft into a vehicle to thereby facilitate handling of the rear-wheel drive shaft.

Specifically, it is preferred that the inclination allowing space for the cage, which is defined by the deep-side bottom portion of the outer joint member and is configured to ensure the ball incorporation angle, have a cage stopper surface. This configuration allows an end surface corner portion on a deep side of the cage to abut against the cage stopper surface to ensure the ball incorporation angle. In this manner, an axial dimension of the outer joint member can be reduced to achieve reduction in weight.

It is preferred that the angle restriction stopper surface comprise a cylindrical surface portion having a joint axis as a center axis, and a portion at which the angle restriction stopper surface and the cage stopper surface meet form a projecting corner portion in a longitudinal cross section containing the joint axis. This configuration allows the angle restriction stopper surface that forms the ball retaining mechanism and the cage stopper surface configured to ensure the ball incorporation angle to be positioned closer to each other. As a result, simple and compact arrangements can be achieved.

It is preferred that an angle α defined by a straight line R that connects the joint center O and an end surface corner portion of the cylindrical shaft portion of the shaft and the joint axis be set to fall within a range of from 10° to 17° in a longitudinal cross section containing the joint axis under a state in which the fixed type constant velocity universal joint forms an operating angle of 0°. This configuration achieves a compact ball retaining mechanism.

It is preferred that the recessed portion formed in the deep-side bottom portion of the outer joint member have a surface formed by forging, and the angle restriction stopper surface at the inner periphery of the recessed portion have a surface formed by turning. Thus, reduction in processing man-hours and cost is achieved.

It is preferred that a boot without a bellows portion be mounted to cover a region between the outer joint member of the fixed type constant velocity universal joint and the shaft. The boot can be prevented from being caught or stuck and coming off by the restriction angle achieved by the ball retaining mechanism. As a result, reduction in size of the boot and supply amount of grease can be achieved.

Effects of the Invention

According to the present invention, the fixed type constant velocity universal joint having the ball retaining mechanism can be reduced in weight and size as a whole joint at low cost. Remarkable reduction in cost, weight, and size can be achieved by using the fixed type constant velocity universal joint for a rear-wheel drive shaft of an automobile. In addition, the balls can be prevented from falling out at the time of conveyance of the rear-wheel drive shaft or mounting of the rear-wheel drive shaft into a vehicle to thereby facilitate handling of the rear-wheel drive shaft.

EMBODIMENTS OF THE INVENTION

Figure 1:
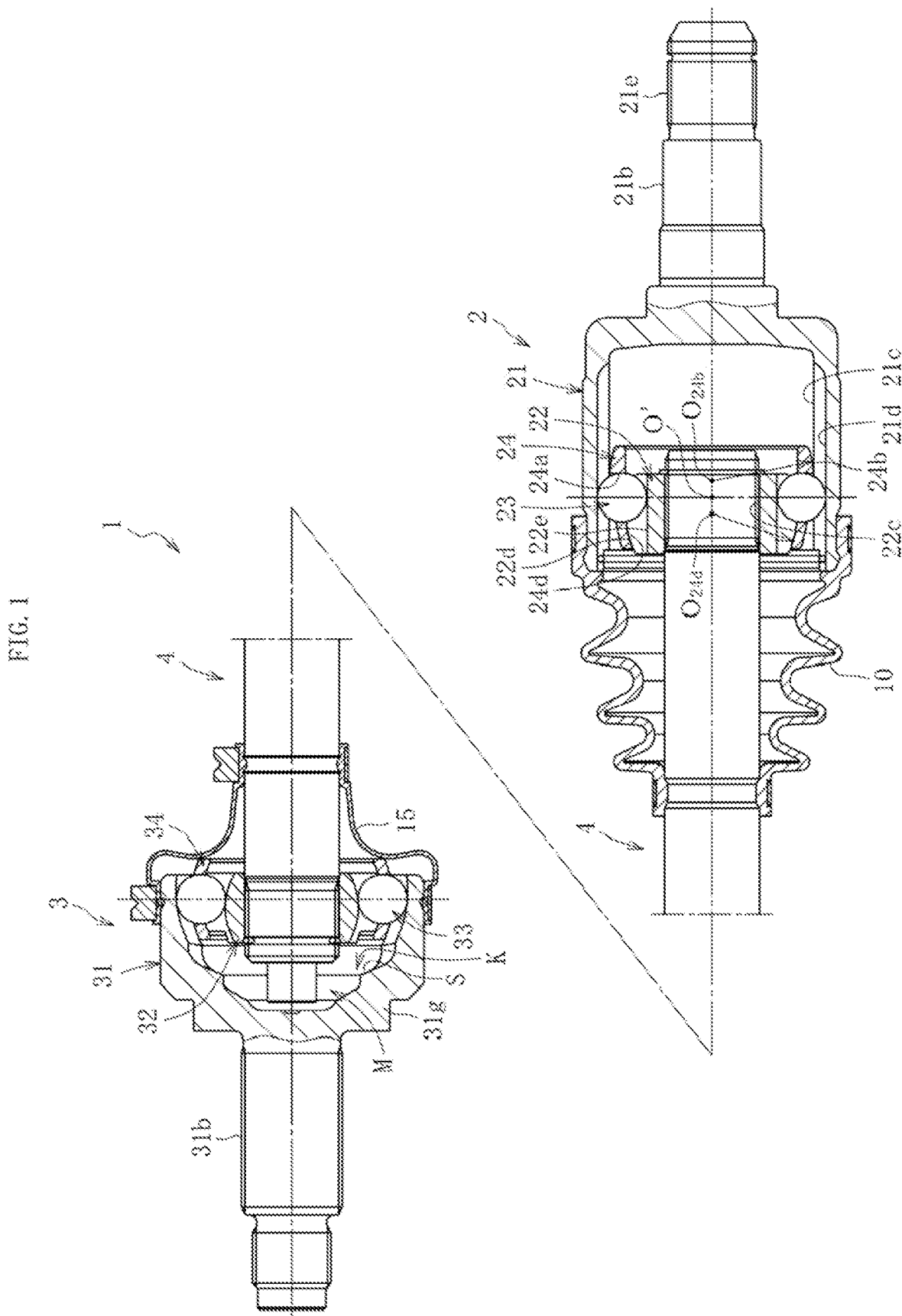
FIG. 1 is a partial longitudinal sectional view of a fixed type constant velocity universal joint according to a first embodiment of this invention, which is used for a rear-wheel drive shaft of an automobile.

With reference to FIG. 1 to FIG. 11, description is made of an embodiment in which a fixed type constant velocity universal joint according to this invention is used for a rear-wheel drive shaft of an automobile. FIG. 1 is a partial longitudinal sectional view of a rear-wheel drive shaft (illustrated without hatching). In FIG. 1, an illustration of a central portion of an intermediate shaft 4 is omitted due to the limit of available space. In addition, a plunging type constant velocity universal joint 2 side and a fixed type constant velocity universal joint 3 side are illustrated in parallel in a staggered manner. As illustrated in FIG. 1, a rear-wheel drive shaft 1 comprises the plunging type constant velocity universal joint 2, the fixed type constant velocity universal joint 3, and the intermediate shaft 4. The plunging type constant velocity universal joint 2 is provided on an inboard side (right side in FIG. 1) and is configured to allow both axial displacement and angular displacement. The fixed type constant velocity universal joint 3 is provided on an outboard side (left side in FIG. 1) and is configured to allow only angular displacement. The rear-wheel drive shaft 1 has the structure in which both the constant velocity universal joints 2 and 3 are coupled by the intermediate shaft 4. The plunging type constant velocity universal joint 2 on the inboard side is coupled to a differential gear (not shown), and the fixed type constant velocity universal joint 3 on the outboard side is coupled to a hub wheel (not shown) of a wheel bearing.

The plunging type constant velocity universal joint 2 is not an object to be achieved by the present invention. However, an outline of the plunging type constant velocity universal joint 2 is described below. The plunging type constant velocity universal joint 2 is a so-called double-offset constant velocity universal joint, and comprises an outer joint member 21, an inner joint member 22, eight balls 23, and a cage 24. The eight balls 23 are configured to transmit torque between the outer joint member 21 and the inner joint member 22. The cage 24 is configured to retain the eight balls 23. The outer joint member 21 integrally comprises a stem section 21b. A spline 21e to be inserted into a spline hole of the differential gear is formed at an outer periphery surface of an inboard-side end portion of the stem section 21b. Eight linear track grooves 21d extending in an axial direction are formed in a cylindrical inner peripheral surface 21c of the outer joint member 21.

A spline hole 22c into which the intermediate shaft 4 is to be inserted is formed along an axial center of the inner joint member 22. Eight linear track grooves 22e extending in the axial direction are formed in a spherical outer peripheral surface 22d of the inner joint member 22. The balls 23 are arranged one by one between the track grooves 21d of the outer joint member 21 and the track grooves 22e of the inner joint member 22, which are opposed to each other in a radial direction.

The cage 24 has eight pockets 24a configured to retain the balls 23. A spherical outer peripheral surface portion 24b is formed on an outer peripheral surface of the cage 24, and is held in slide contact with the cylindrical inner peripheral surface portion 21c of the outer joint member 21. A spherical inner peripheral surface portion 24d is formed on an inner peripheral surface of the cage 24, and is held in slide contact with the spherical outer peripheral surface 22d of the inner joint member 22.

A curvature center $O_{24b}$ of the spherical outer peripheral surface portion 24b of the cage 24, and a curvature center $O_{24d}$ of the spherical inner peripheral surface portion 24d of the cage 24 are offset to opposite sides in the axial direction with respect to joint center O' by an equal distance. With this configuration, at a freely-selected operating angle, the balls 23 retained by the cage 24 are always guided within a plane obtained by bisection of the operating angle, thereby ensuring a constant velocity characteristic between the outer joint member 21 and the inner joint member 22.

A boot 10 is mounted onto an outer periphery of the outer joint member 21 and an outer periphery of the intermediate shaft 4 coupled to the inner joint member 22. The boot 10 has a bellows portion, and has both ends fastened and fixed by boot bands. Grease serving as lubricant is enclosed inside the joint covered with the boot 10.

Figure 2A:
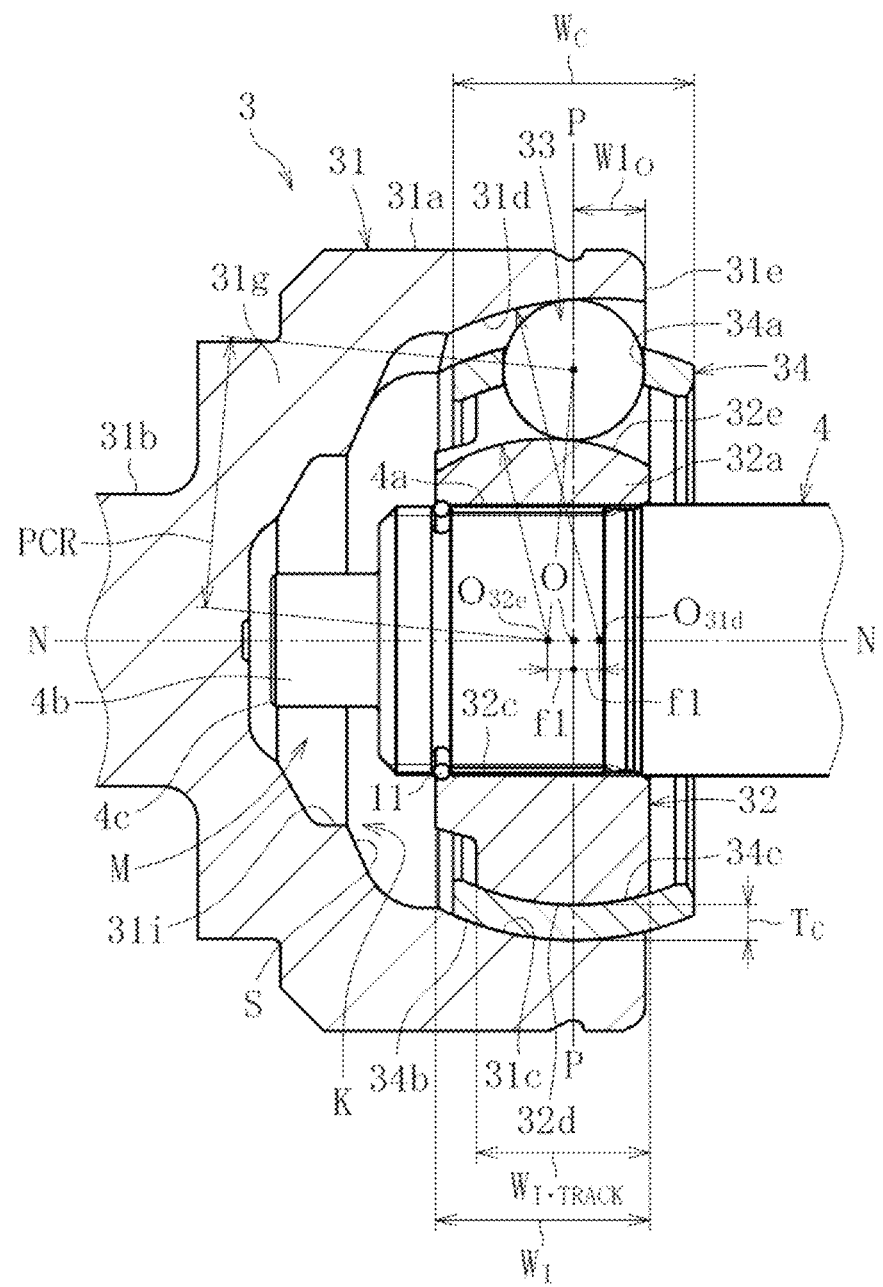
FIG. 2A is a longitudinal sectional view of the fixed type constant velocity universal joint, which is taken along the line A-N-B of FIG. 2B.
Figure 2B:
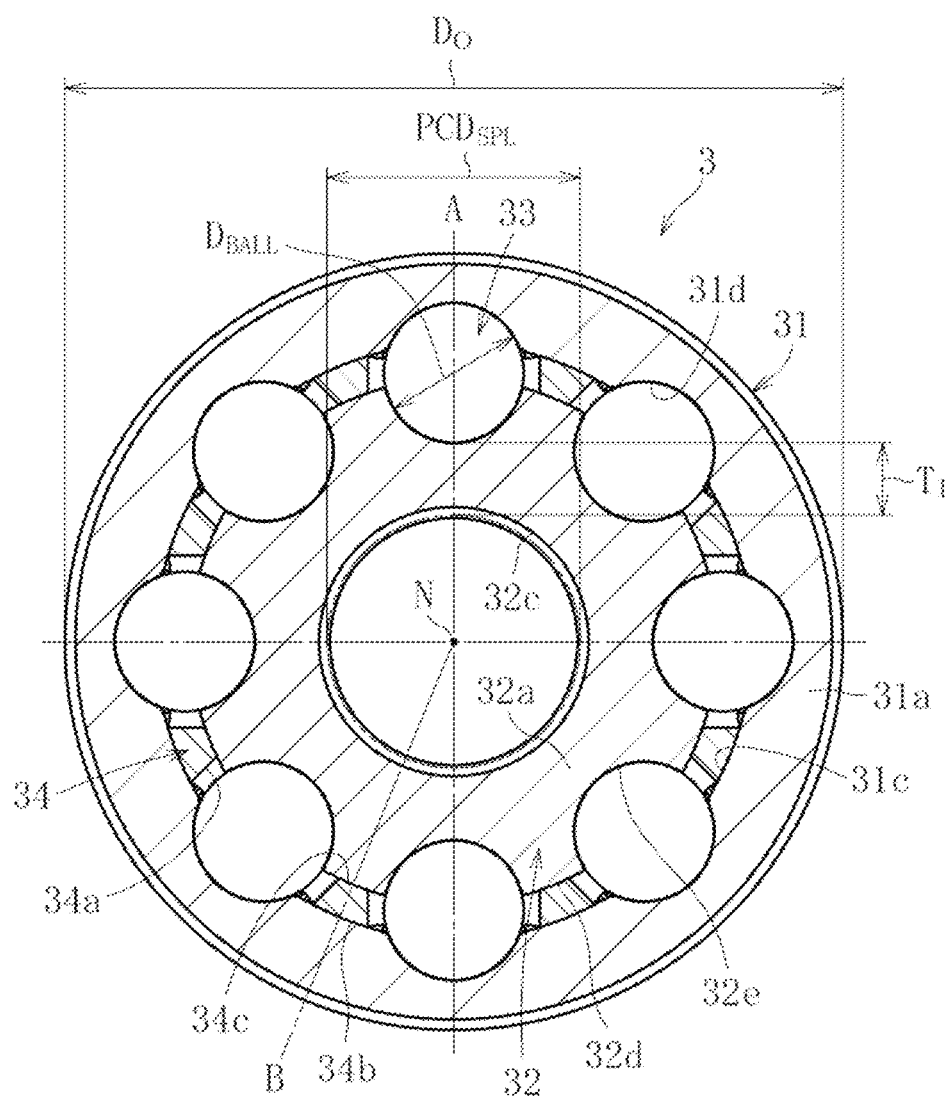
FIG. 2B is a transverse sectional view, taken along the line P-P of FIG. 2A.

Next, an overall configuration of the fixed type constant velocity universal joint in this embodiment is described with reference to FIG. 1 and FIG. 2. FIG. 2A is a longitudinal sectional view of the fixed type constant velocity universal joint 3, which is taken along the line A-N-B of FIG. 2B. FIG. 2B is a transverse sectional view, taken along the line P-P of FIG. 2A. In FIG. 2B, an illustration of the intermediate shaft 4 is omitted. A "shaft" recited in the claims corresponds to the intermediate shaft 4. As illustrated in FIG. 1, the fixed type constant velocity universal joint 3 mainly comprises an outer joint member 31, an inner joint member 32, eight balls 33, and a cage 34. The eight balls 33 are configured to transmit torque between the outer joint member 31 and the inner joint member 32. The cage 34 is configured to retain the eight balls 33. The fixed type constant velocity universal joint 3 has a ball retaining mechanism M at a position corresponding to a cage stopper surface S, which is configured to ensure a ball incorporation angle at a deep-side bottom portion 31g of the outer joint member 31, and an outboard-side end portion of the intermediate shaft 4. The outer joint member 31 in this embodiment includes an inclination allowing space K for the cage 34, which is configured to ensure the ball incorporation angle, and the inclination allowing space K has the cage stopper surface S. The outer joint member 31 integrally comprises a stein section 31b. The stem section 31b is coupled to the hub wheel (not shown) of the wheel bearing. A boot 15 without a bellows portion is mounted onto an outer periphery of the outer joint member 31 and the outer periphery of the intermediate shaft 4 coupled to the inner joint member 32.

As illustrated in FIG. 2, the outer joint member 31 integrally comprises a mouth section 31a and the stem section 31b. The mouth section 31a has a cup-like shape with one open side in the axial direction (inboard side or right side in FIG. 2A). The stem section 31b extends from the deep-side bottom portion 31g of the mouth section 31a toward another side in the axial direction (outboard side or left side in FIG. 2A). Eight curved track grooves 31d are formed in a spherical inner peripheral surface 31c of the mouth section 31a. The track grooves 31d are formed equiangularly and extend in the axial direction. Each of the track grooves 31d extends to an opening-side end surface 31e of the mouth section 31a of the outer joint member 31. A spline hole 32c into which the intermediate shaft 4 is to be inserted is formed along an axial center of the inner joint member 32 (spline includes serration; the same applies hereinafter). Eight curved track grooves 32e opposed to the track grooves 31d of the outer joint member 31 are formed in a spherical outer peripheral surface 32d of the inner joint member 32. The track grooves 32e are formed equiangularly and extend in the axial direction.

The eight balls 33 configured to transmit torque are arranged one by one between the track grooves 31d of the outer joint member 31 and the track grooves 32e of the inner joint member 32, respectively. The cage 34 configured to retain the balls 33 is arranged between the spherical inner peripheral surface 31c of the outer joint member 31 and the spherical outer peripheral surface 32d of the inner joint member 32. The cage 34 has eight pockets 34a configured to retain the balls 33. All the eight pockets 34a have the same shape, and are arranged equiangularly. A spherical outer peripheral surface 34b of the cage 34 is held in slide contact with the spherical inner peripheral surface 31c of the outer joint member 31. A spherical inner peripheral surface 34c of the cage 34 is held in slide contact with the spherical outer peripheral surface 32d of the inner joint member 32.

A transverse sectional shape of each of the track grooves 31d of the outer joint member 31 and the track grooves 32e of the inner joint member 32 is an elliptic shape or a Gothic arch shape. With this configuration, the track grooves 31d and 32e and the balls 33 are held in contact with each other at a contact angle of from about 30° to about 45°, in other words, held in so-called angular contact with each other. A transverse sectional shape of each of the track grooves 31d and 32e may be an arc shape, and the track grooves 31d and 32e and the balls 33 may be held in so-called circular contact with each other.

A curvature center $O_{31d}$ of the track grooves 31d of the outer joint member 31, and a curvature center $O_{32e}$ of the track grooves 32e of the inner joint member 32 are offset to opposite sides in the axial direction with respect to a joint center O by an equal distance f1. In the illustrated example, the curvature center $O_{31d}$ of the track grooves 31d of the outer joint member 31 is offset to the inboard side (opening side) with respect to the joint center O, and the curvature center $O_{32e}$ of the track grooves 32e of the inner joint member 32 is offset to the outboard side (deep side) with respect to the joint center O. Meanwhile, both of a curvature center of the spherical inner peripheral surface 31c of the outer joint member 31 and a curvature center of the spherical outer peripheral surface 32d of the inner joint member 32 match the joint center O. A curvature center of the spherical outer peripheral surface 34b and a curvature center of the spherical inner peripheral surface 34c of the cage 34, which are in slide contact with the spherical inner peripheral surface 31c and the spherical outer peripheral surface 32d, respectively, also match the joint center O. The matching of the curvature centers allows the balls 33 retained in the cage 34 to be always guided to a plane obtained by bisection of the operating angle, thereby ensuring a constant velocity characteristic between the outer joint member 31 and the inner joint member 32.

A spline 4a at the outboard-side end portion of the intermediate shaft 4 is fitted into the spline hole 32c of the inner joint member 32 of the fixed type constant velocity universal joint 3. Thus, the intermediate shaft 4 and the inner joint member 32 are coupled to each other in a torque transmittable manner. An annular recessed groove is formed in the outboard-side end portion of the intermediate shaft 4, and a snap ring 11 is fitted into the recessed groove. Through engagement of the snap ring 11 with an outboard-side step portion of the inner joint member 32, the intermediate shaft 4 and the inner joint member 32 are prevented from coming off.

Next, a characteristic configuration of the fixed type constant velocity universal joint 3 in this embodiment is described. The characteristic configuration is achieved based on the following novel idea. Specifically, essential internal specifications are found among various internal specifications of a lightweight and compact fixed type constant velocity universal joint to be exclusively used for a rear-wheel drive shaft. The internal specifications are combined with the inclination allowing space K (cage stopper surface S) for the cage, which is configured to ensure the ball incorporation angle, and dimensions and arrangements of the ball retaining mechanism M. Thus, the characteristic configuration corresponds to the fixed type constant velocity universal joint 3 having the ball retaining mechanism M, which is lightweight and compact as a whole joint and is achieved at low cost.

Now, an outline of an internal load, actions, and internal specifications of the fixed type constant velocity universal joint is described. In the fixed type constant velocity universal joint, loads are applied evenly to the respective balls under a state in which an operating angle is 0°. However, when the operating angle is formed, uneven loads are applied to the respective balls, and a difference in loads applied to the respective balls becomes larger as the operating angle becomes larger. Thus, in a case of the large operating angle, maximum loads applied to the respective balls are large, and hence members (the outer joint member, the inner joint member, and the cage) held in contact with the balls are required to have thicknesses large enough to bear the maximum loads applied from the balls. Accordingly, when the fixed type constant velocity universal joint is used exclusively for the rear-wheel drive shaft to reduce the maximum operating angle, the maximum loads applied to the balls are reduced, and each component held in contact with the balls has a sufficient margin of strength. Thus, without causing reduction in load capacity and durability, a thickness of each component can be reduced. In this manner, the size of the fixed type constant velocity universal joint can be reduced as compared to that of a conventional product (Rzeppa type constant velocity universal joint having a large operating angle and including eight balls, which is applicable to both the front-wheel drive shaft and the rear-wheel drive shaft). Thus, a size of the fixed type constant velocity universal joint in the radial direction can be reduced, and hence reduction in weight can be achieved.

When a maximum operating angle is set to 20° or less (a maximum operating angle of conventional products is about 47°) for the fixed type constant velocity universal joint so that the fixed type constant velocity universal joint is exclusively used for a rear-wheel drive shaft, a movement amount of each of the balls in the axial direction with respect to the outer joint member is reduced, and a length of a locus of a contact point between the track groove and the ball is reduced. Thus, an axial length of each of the track grooves of the outer joint member, in particular, an axial length from the joint center to the opening-side end surface of the outer joint member can be reduced. In this manner, a size of the fixed type constant velocity universal joint in the axial direction can be reduced, and hence reduction in weight can be achieved.

Incidentally, the constant velocity universal joints are mass-produced products. Thus, typically, stepwise joint sizes are set for the constant velocity universal joints in accordance with torque load capacity, and internal specifications are set for each size (a series of the constant velocity universal joints is launched). In order to achieve reduction in weight and size of the constant velocity universal joint of respective sizes, when the ball diameter is reduced, contact pressure at contact portions between the balls and the track grooves is increased, which directly causes reduction in torque load capacity. Accordingly, when study is made on design change of the constant velocity universal joint, in order to maintain torque load capacity, the ball diameter is not changed in most cases unless the number of the balls is increased. Thus, when a dimension of each component is represented by a ratio to the ball diameter, the internal specifications of the constant velocity universal joint in accordance with torque load capacity (that is, joint size of the constant velocity universal joint) can be shown.

The fixed type constant velocity universal joint 3 in this embodiment is used exclusively for the rear-wheel drive shaft, and hence the maximum operating angle can be set smaller than that of a conventional product that is also usable for a front-wheel drive shaft. The maximum operating angle of the fixed type constant velocity universal joint 3 is set to 20° or less. In this manner, reduction in weight and size of the fixed type constant velocity universal joint 3 can be achieved while maintaining load capacity. In the following, various internal specifications of the fixed type constant velocity universal joint 3 are described.

With reference to Table 1 and FIG. 2, the internal specifications of the fixed type constant velocity universal joint 3 in this embodiment are specifically described. A conventional product in Table 1 is a Rzeppa type constant velocity universal joint having the same ball diameter, a maximum operating angle of 47°, and eight balls.

TABLE 1

|  | Product of the present invention | Conventional product |
| --- | --- | --- |
| (1) Ball PCD ($PCD_{BALL}$)/ball diameter | 3.70 to 3.87 | 3.81 to 3.98 |
| (2) Inner ring track length ($W_{I\text{-}TRACK}$)/ball diameter | 1.1 to 1.3 | 1.8 to 1.9 |
| (3) Inner ring width ($W_I$)/ball diameter | 1.40 to 1.55 | 1.8 to 1.9 |
| (4) Inner ring thickness ($T_I$)/ball diameter | 0.40 to 0.51 | 0.52 to 0.59 |
| (5) Spline PCD ($PCD_{SPL}$)/ball diameter | 1.82 to 1.92 | 1.72 to 1.82 |
| (6) Outer-ring outer diameter ($D_O$)/spline PCD ($PCD_{SPL}$) | 2.9 to 3.0 | 3.1 to 3.3 |
| (7) Length ($W1_o$) between joint center and outer-ring opening end surface/ball diameter | 0.35 to 0.52 | 1.1 to 1.2 |
| (8) Cage thickness ($T_C$)/ball diameter | 0.22 to 0.25 | 0.25 to 0.28 |
| (9) Cage width ($W_C$)/ball diameter | 1.63 to 1.80 | 1.85 to 2.02 |

Parameters are defined as follows.
(1) Ball PCD (pitch circle diameter of the balls) $PCD_{BALL}$: The ball PCD has a value twice as large as a length of a line segment connecting a center of the ball 33 to the curvature center $O_{31d}$ of the track grooves 31d of the outer joint member 31 or the curvature center $O_{32e}$ of the track grooves 32e of the inner joint member 32 (A length of a line segment connecting the center of the ball 33 to the curvature center $O_{31d}$ of the track grooves 31d of the outer joint member 31 and a length of a line segment connecting the center of the ball 33 to the curvature center $O_{32e}$ of the track grooves 32e of the inner joint member 32 are equal. A dimension of the line segments is represented by PCR.) ($PCD_{BALL}$=2× PCR).
(2) Inner ring track length (axial length of the track groove of the inner joint member) $W_{I\text{-}TRACK}$: Strictly speaking, the inner ring track length is an axial length of a locus of a contact point between the track groove 32e of the inner joint member 32 and the ball 33. However, in Description, the inner ring track length refers to an axial length of the spherical outer peripheral surface 32d of the inner joint member 32, that is, an axial distance between end surfaces extending radially inward from both ends of the spherical outer peripheral surface 32d in the axial direction.
(3) Inner ring width (axial width of the inner joint member) $W_1$: The inner ring width is a maximum axial dimension of the inner joint member 32. In the illustrated example, the inner ring width is an axial distance between both end surfaces of a groove-bottom cylindrical portion 32a of the inner joint member 32.

(4) Inner ring thickness (radial thickness of the inner joint member) $T_I$: The inner ring thickness is a radial distance between a groove bottom of the track groove 32e in a joint center plane P (plane that passes the joint center O and is orthogonal to the joint axis) and a pitch circle of the spline hole 32c.

(5) Spline PCD (pitch circle diameter of the spline hole of the inner joint member) $PCD_{SPL}$: The spline PCD is a diameter of a pitch circle of meshing between the spline hole 32c of the inner joint member 32 and the spline 4a of the intermediate shaft 4.

(6) Outer-ring outer diameter $D_o$: The outer-ring outer diameter is a maximum outer diameter of the outer joint member 31.

(7) A length $W1_o$ between the joint center and an outer-ring opening end surface: The length is an axial distance between the joint center O and the opening-side end surface of the mouth section 31a of the outer joint member 31.

(8) Cage thickness $T_C$: The cage thickness is a radial thickness of the cage 34 in the joint center plane P.

(9) Cage width $W_C$: The cage width is a maximum axial dimension of the cage 34. In the illustrated example, the cage width is an axial distance between both end surfaces of the cage 34.

Next, description is made of a design concept leading to the above-mentioned internal specifications. In the fixed type constant velocity universal joint 3, as the operating angle is increased, a maximum load applied to each of the balls 33 is increased. Accordingly, when the maximum operating angle is reduced, the maximum load applied to each of the balls 33 is reduced. Thus, the inner joint member 32 to be held in contact with the balls 33 has a sufficient margin of strength. As a result, the radial thickness of the inner joint member 32 can be reduced while maintaining strength and durability equivalent to that of the conventional product [see the row (4) in Table 1]. When the inner joint member 32 is thus reduced in thickness, the pitch circle diameter of the track grooves 32e of the inner joint member 32, that is, the pitch circle diameter of the balls 33 arranged in the track grooves 32e can be reduced [see the row (1) in Table 1]. In this manner, a size of the fixed type constant velocity universal joint 3 in the radial direction is reduced, and thus reduction in weight can be achieved.

Through reduction of the maximum operating angle, the maximum load applied to each of the balls 33 is reduced so that the cage 34 held in contact with the balls 33 has a sufficient margin of strength. Accordingly, the radial thickness of the cage 34 can be reduced while maintaining strength and durability equivalent to that of the conventional product [see the row (8) in Table 1]. Further, a movement amount of the ball 33 in the radial direction in the pocket 34a of the cage 34 is reduced. Also from this point of view, the radial thickness of the cage 34 can be reduced. As described above, the thickness $T_C$ of the cage 34 is reduced, and the pitch circle diameter $PCD_{BALL}$ of the balls 33 is reduced at the same time. Thus, while depths of the track grooves 31d of the outer joint member 31 and depths of the track grooves 32e of the inner joint member 32 are ensured so as to prevent the balls 33 from climbing on edge portions of the track grooves, reduction in weight and size of the fixed type constant velocity universal joint 3 can be achieved.

The movement amount of each of the balls 33 in the axial direction is reduced by reducing the maximum operating angle. Thus, the axial length of each of the track grooves 32e of the inner joint member 32 can be reduced [see the row (2) in Table 1]. In this manner, a size of the inner joint member 32 can be reduced in the axial direction, and hence reduction in weight can be achieved.

When the maximum operating angle is thus reduced, a movement amount of the ball 33 in the axial direction with respect to the outer joint member 31 is reduced. As a result, an axial length of the track groove 31d of the outer joint member 31, in particular, an axial length of a portion of the track groove 31d on an opening side with respect to the joint center O, specifically, an axial length from the joint center O to the opening-side end surface 31e of the outer joint member 31 can be reduced [see the row (7) in Table 1]. In this manner, a size of the outer joint member 31 in the axial direction is reduced, and thus reduction in weight can be achieved.

As described above, the cage 34 has a sufficient margin of strength. Accordingly, the axial width of the cage 34 can be reduced while maintaining strength and durability equivalent to that of the conventional product [see the row (9) in Table 1]. In this manner, a size of the cage 34 in the axial direction is reduced, and thus reduction in weight can be achieved.

As described above, the radial thickness $T_I$ of the inner joint member 32 can be reduced, with the result that a diameter of the spline hole 32c of the inner joint member 32 can be increased [see the row (5) in Table 1]. In this manner, the intermediate shaft 4 to be inserted into the spline hole 32c is increased in diameter, and thus torsional strength can be enhanced. Further, as described above, the pitch circle diameter of the balls 33 can be reduced, with the result that size of the outer joint member 31 can be reduced. From the above description, a ratio $D_o/PCD_{SPL}$ of the outer diameter $D_o$ of the outer joint member 31 to the pitch circle diameter $PCD_{SPL}$ of the spline hole 32c of the inner joint member 32 can be set smaller than that of the conventional product [see the row (6) in Table 1]. In this manner, reduction in weight and size of the fixed type constant velocity universal joint 3, and improvement in strength of the intermediate shaft 4 can be achieved at the same time.

Further, as described above, when the diameter of the spline hole 32c of the inner joint member 32 is increased, a pitch circle diameter of a fitting portion between the spline hole 32c of the inner joint member 32 and the spline 4a of the intermediate shaft 4 is increased, with the result that contact pressure at a contact portion between spline teeth is reduced. Thus, while maintaining the contact pressure for each spline tooth, the axial length of the spline hole 32c of the inner joint member 32 can be reduced. Accordingly, the axial width of the groove-bottom cylindrical portion 32a of the inner joint member 32 can be reduced. In this manner, not only the axial length of each of the track grooves 32e of the inner joint member 32 but also the axial length of the spline hole 32c is reduced, thereby being capable of reducing the axial width $W_1$ of the entire inner joint member 32 [see the row (3) in Table 1].

The internal specifications of the fixed type constant velocity universal joint 3 are determined based on the design idea described above. The following conclusion has been found as a result of various examinations conducted to combine the inclination allowing space K (cage stopper surface S) for the cage, which is configured to ensure the ball incorporation angle described later, and the dimensions and arrangements of the ball retaining mechanism M. To reduce the fixed type constant velocity universal joint in weight and size as a whole joint, it is essential to set, among various internal specifications described above, in particular, a ratio $W1_o/D_{BALL}$ of the axial length $W1_o$ from the joint center to the opening-side end surface of the outer joint member to the diameter $D_{BALL}$ of each of the balls in the row (7) of Table 1 within a range of from 0.35 to 0.52 and set a ratio $W_C/D_{BALL}$ of the width $W_C$ of the cage to the diameter $D_{BALL}$ of each of the balls in the row (9) of Table 1 within a range of from 1.63 to 1.80.

In this embodiment, the fixed type constant velocity universal joint 3 has the inclination allowing space K (cage stopper surface S) for the cage, which is configured to ensure the ball incorporation angle, and the ball retaining mechanism M based on the above-mentioned internal specifications.

Figure 3A:
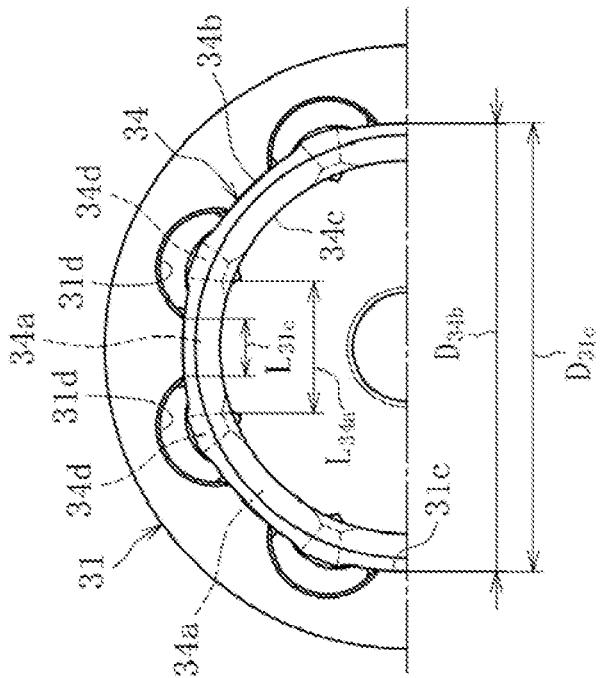
FIG. 3A is a longitudinal sectional view for illustrating a state in which a cage is being incorporated inside an inner periphery of an outer joint member.
Figure 3B:
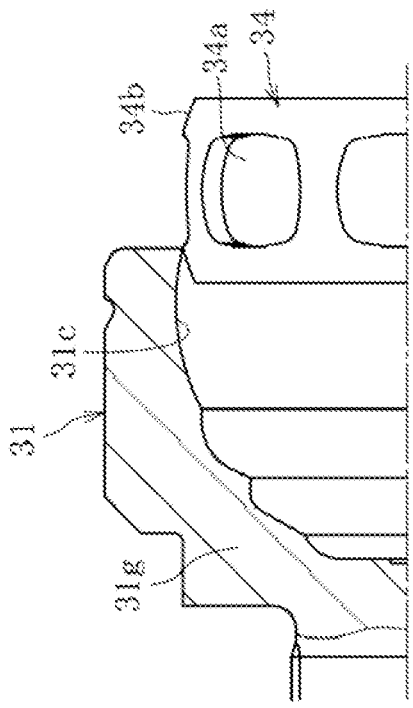
FIG. 3B is a right side view of FIG. 3A.

A method of incorporating the cage 34 inside an inner periphery of the outer joint member 31 is described with reference to FIG. 3. FIG. 3A is a longitudinal sectional view for illustrating a state in which the cage 34 is being incorporated inside the inner periphery of the outer joint member 31. FIG. 3B is a right side view of FIG. 3A. Under an actual state, the inner joint member 32 has already been incorporated inside the cage 34. However, an illustration of the inner joint member 32 is omitted in FIG. 3A and FIG. 3B.

When the internal specifications are set so that the ratio $W1_o/D_{BALL}$ of the axial length $W1_o$ from the joint center O to the opening-side end surface 31e of the outer joint member 31 to the diameter $D_{BALL}$ of each of the balls falls within a range of from 0.35 to 0.52, radially inward protrusion of an opening-side end portion of the spherical inner peripheral surface 31c of the outer joint member 31 is reduced. As a result, an inner diameter of an opening portion of the outer joint member 31 increases. Thus, as illustrated in FIG. 3B, an inner diameter $D_{31c}$ of the spherical inner peripheral surface 31c of the outer joint member 31 at its opening-side end portion can be set larger than an outer diameter $D_{34b}$ of the pocket 34a across its central portion in a circumferential direction when the cage 34 is viewed in the axial direction. In FIG. 3B, the inner diameter $D_{31c}$ of the outer joint member 31 and the outer diameter $D_{34b}$ of the cage 34 are illustrated as being substantially the same. In practice, however, the inner diameter $D_{31c}$ of the outer joint member 31 is slightly larger than the outer diameter $D_{34b}$ of the cage 34. Further, a circumferential length $L_{31c}$ of a region of the spherical inner peripheral surface 31c of the outer joint member 31, which is located between the track grooves 31d adjacent to each other, is smaller than a circumferential length $L_{34a}$ of the pocket 34a of the cage 34.

Thus, as illustrated in FIG. 3A, under a state in which the outer joint member 31 and the cage 34 are coaxially arranged, and columnar portions 34d of the cage 34 provided between the pockets 34a in the circumferential direction are arranged to face the track grooves 31d of the outer joint member 31, the cage 34 can be incorporated inside the inner periphery of the outer joint member 31. As described above, when the cage 34 and the outer joint member 31 are assembled to each other while their axial centers match each other, a space that can accommodate the cage 34 with its axis being orthogonal to a deep-side inner portion of the outer joint member 31 is not required as otherwise needed in conventional products. Thus, a position of the deep-side bottom portion 31g can be set closer to the opening. Consequently, the axial dimension of the outer joint member 31 can be reduced, and assembly steps can be simplified.

Figure 4:
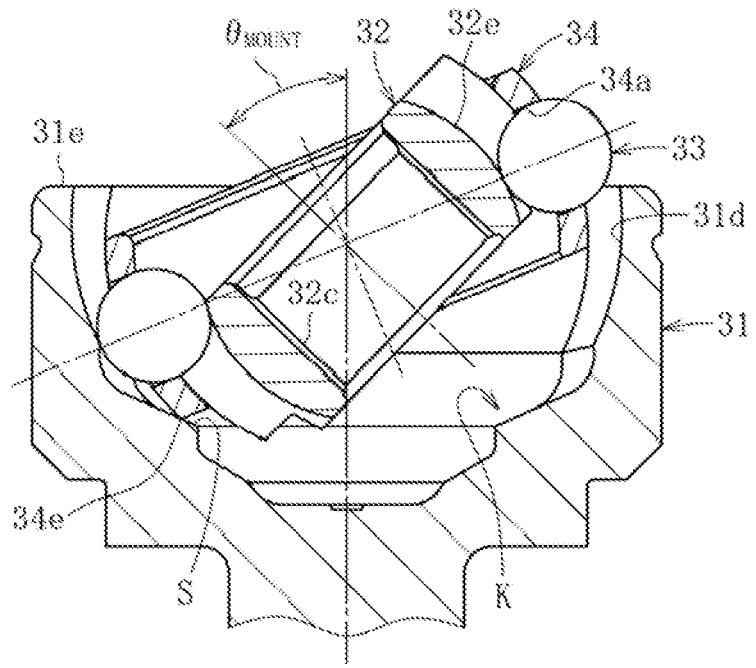
FIG. 4 is a longitudinal sectional view for illustrating a state in which balls are being incorporated.

After the cage 34 and the inner joint member 32 are incorporated inside the inner periphery of the outer joint member 31, the balls 33 are incorporated. The incorporation of the balls is described with reference to FIG. 4 for illustrating a state in which the balls 33 are being incorporated. As illustrated in FIG. 4, the outer joint member 31 is arranged so that its center axis extends in an up-and-down direction under a state in which the intermediate shaft 4 is not inserted into the spline hole 32c of the inner joint member 32. Then, when the outer joint member 31 and the inner joint member 32 are bent with respect to each other at an angle larger than the maximum operating angle, an end surface corner portion 34e of the cage 34 on its deep side abuts against the cage stopper surface S. Under a state in which the end surface corner portion 34e is in abutment against the cage stopper surface S, one of the pockets 34a of the cage 34 is exposed from the outer joint member 31. Specifically, a gap larger than the diameter $D_{BALL}$ of each of the balls 33 is defined by the opening-side end portion of the track groove 31d of the outer joint member 31 and the pocket 34a. The operating angle at this time is referred to as "ball incorporation angle $\theta_{MOUNT}$." In this embodiment, the ball incorporation angle $\theta_{MOUNT}$ of the fixed type constant velocity universal joint 3 is, for example, about 48°, and is smaller than a ball incorporation angle (for example, about 65°) of conventional products. After the ball 33 is incorporated into the exposed pocket 34a, the remaining pockets 34a are similarly exposed in order so that the balls 33 are incorporated thereinto. After all the balls 33 are incorporated, the operating angle is returned to about 0°. Then, the intermediate shaft 4 onto which the boot 15 (see FIG. 1) is mounted is inserted into the spline hole 32c of the inner joint member 32 to thereby complete the rear-wheel drive shaft 1.

As described above, in the fixed type constant velocity universal joint 3 in this embodiment, the ratio $W1_o/D_{BALL}$ of the axial length $W1_o$ from the joint center O to the opening-side end surface 31e of the outer joint member 31 to the diameter $D_{BALL}$ of the ball is set to fall within the range of from 0.35 to 0.52. The cage 34 and the outer joint member 31 are assembled to each other under a state in which their axial centers match each other. Thus, a position of the deep-side bottom portion of the outer joint member 31 can be set closer to the opening. As a result, the cage stopper surface S described above can be formed. When the cage stopper surface S is set to allow a minimum necessary ball incorporation angle $\theta_{MOUNT}$ to be ensured, the axial dimension of the outer joint member 31 can be reduced to achieve reduction in weight.

Figure 5:
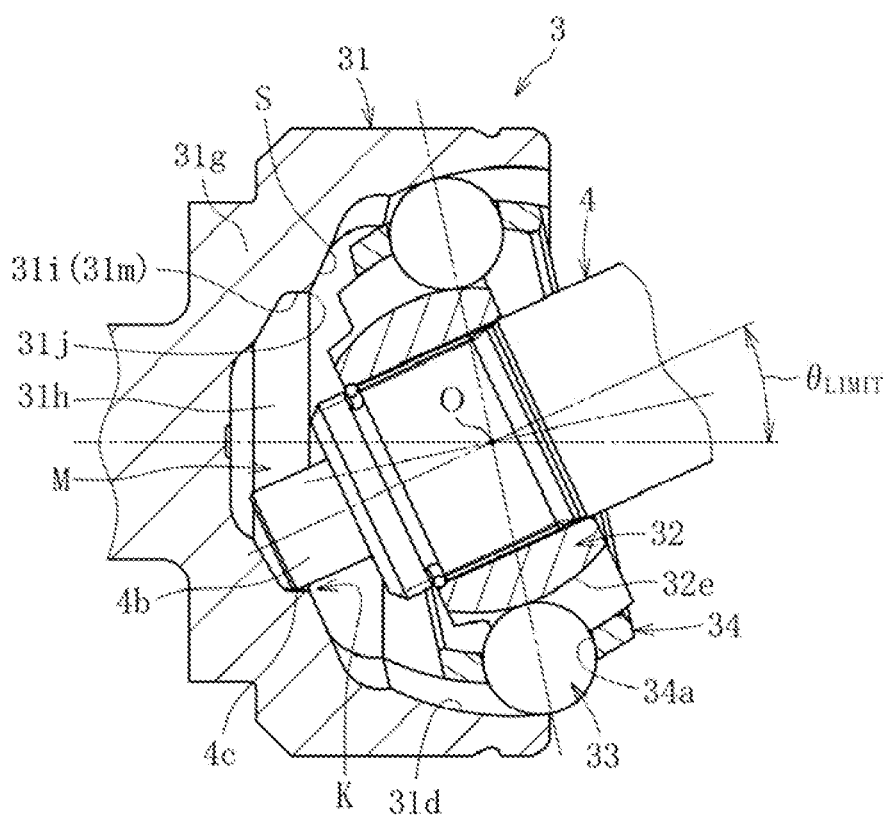
FIG. 5 is a longitudinal sectional view for illustrating a state in which an angle is restricted by a ball retaining mechanism.
Figure 6:
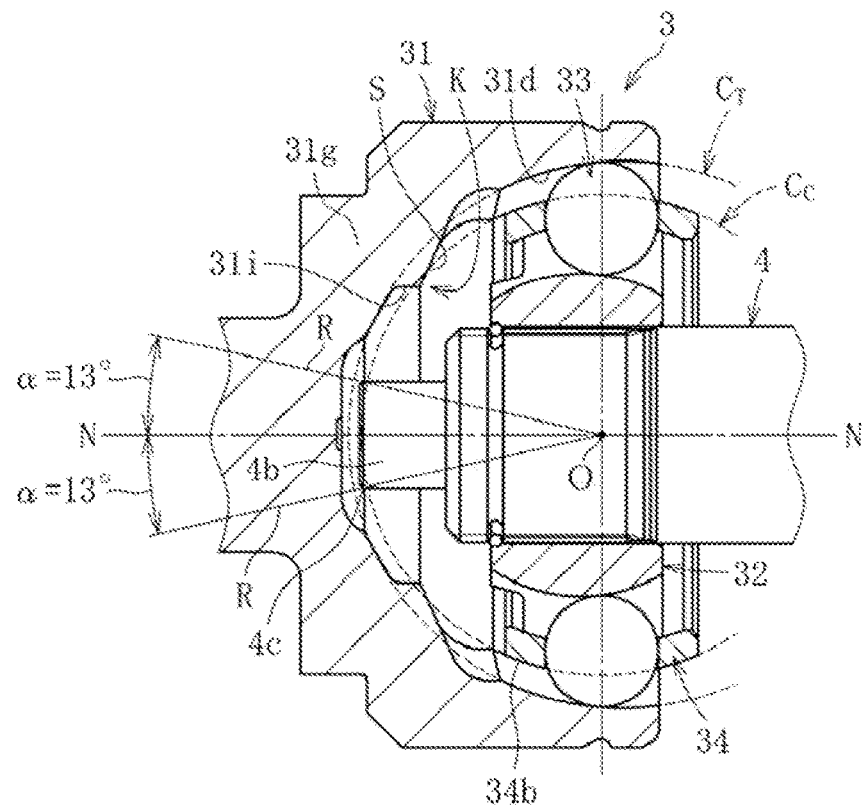
FIG. 6 is a longitudinal sectional view for illustrating a specific example in which dimensions and arrangements of each part of the ball retaining mechanism are adjusted.
Figure 7:
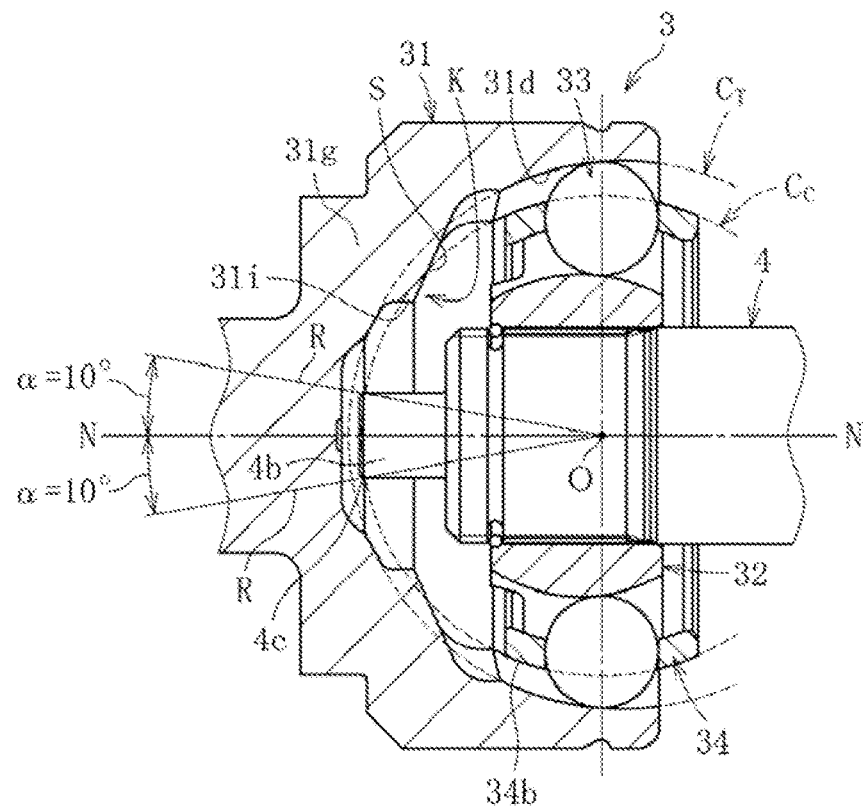
FIG. 7 is a longitudinal sectional view for illustrating a specific example in which the dimensions and arrangements of each part of the ball retaining mechanism are adjusted.
Figure 8:
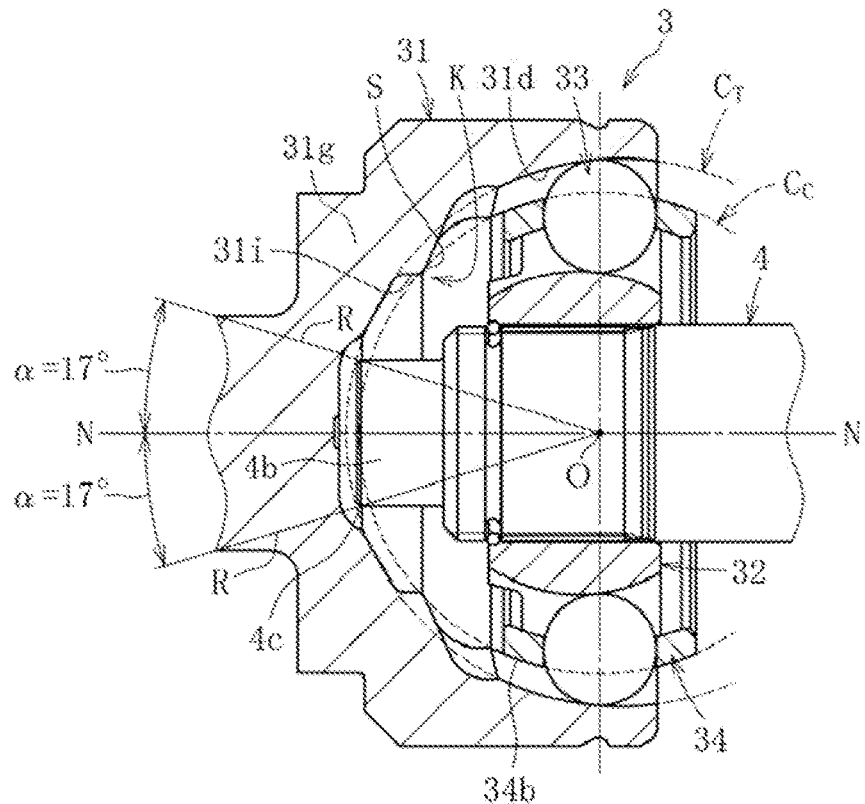
FIG. 8 is a longitudinal sectional view for illustrating a specific example in which the dimensions and arrangements of each part of the ball retaining mechanism are adjusted.
Figure 9:
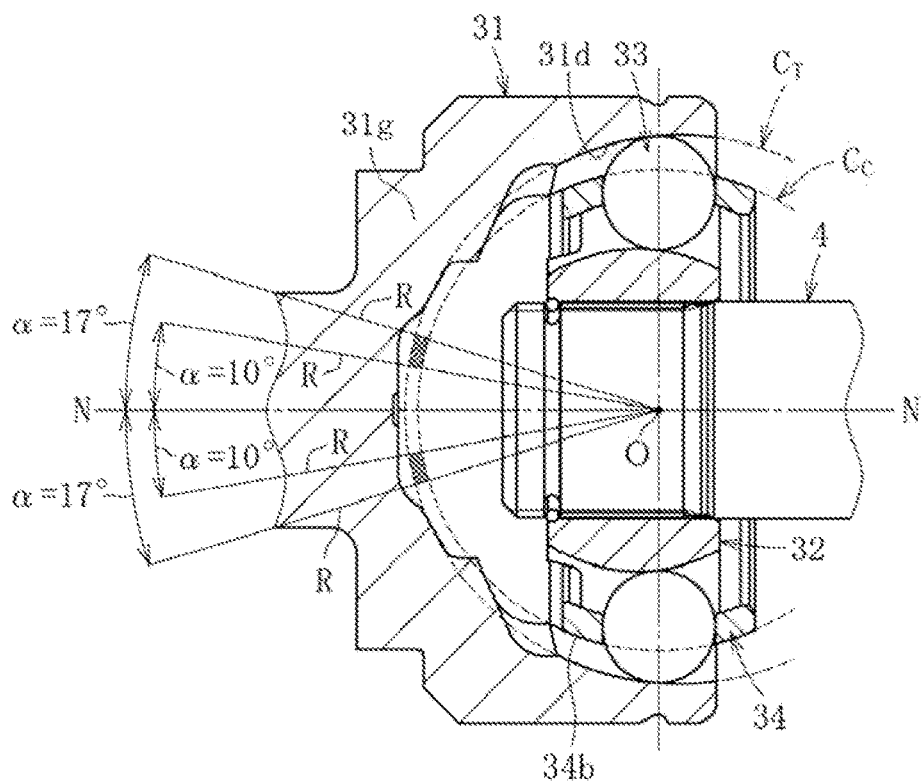
FIG. 9 is a schematic view for comprehensively illustrating the dimensions and arrangements of the ball retaining mechanism.

Next, the ball retaining mechanism M is described with reference to FIG. 5 to FIG. 9. FIG. 5 is a longitudinal sectional view for illustrating a state in which an angle is restricted by the ball retaining mechanism M. FIG. 6 to FIG. 8 are longitudinal sectional views, each for illustrating a specific example in which dimensions and arrangements of the ball retaining mechanism M are adjusted. FIG. 9 is a schematic view for comprehensively illustrating the dimensions and arrangements of the ball retaining mechanism M.

In this embodiment, as described above, the fixed type constant velocity universal joint 3 has the maximum operating angle of, for example, 20° or less when in use, and the ball incorporation angle $\theta_{MOUNT}$ of, for example, about 48°. The fixed type constant velocity universal joint 3 in this embodiment has the ball retaining mechanism M to prevent such a situation that, at the time of conveyance of the rear-wheel drive shaft 1 or mounting of the rear-wheel drive shaft 1 into a vehicle after the rear-wheel drive shaft 1 including the fixed type constant velocity universal joint 3 is completed, the fixed type constant velocity universal joint 3 forms the operating angle as large as the ball incorporation angle $\theta_{MOUNT}$, which may cause the balls 33 to fall out from the track grooves.

As illustrated in FIG. 5, the ball retaining mechanism M comprises a cylindrical shaft portion 4b and an angle restriction stopper surface 31*i*. The cylindrical shaft portion 4*b* is formed at the outboard-side end portion of the intermediate shaft 4. The angle restriction stopper surface 31*i* is located at an inner periphery of a recessed portion 31*h* formed in the deep-side bottom portion 31*g* of the outer joint member 31. The angle restriction stopper surface 31*i* has a cylindrical surface portion 31*m* having the joint axis as a center axis. An end surface corner portion 4*c* of the cylindrical shaft portion 4*b* and the angle restriction stopper surface 31*i* interfere with each other at an angle smaller than the ball incorporation angle $\theta_{MOUNT}$ and larger than the maximum operating angle formed when the joint is in use to restrict the angle. A restriction angle $\theta_{LIMIT}$ is, for example, 25°. In this manner, the operating angle is restricted to the restriction angle by the ball retaining mechanism M. Thus, the balls 33 are prevented from falling out from the opening-side end portions of the track grooves 31*d* of the outer joint member 31. As a result, the balls 33 are prevented from falling out at the time of conveyance of the rear-wheel drive shaft 1 or mounting of the rear-wheel drive shaft 1 into a vehicle, thereby facilitating handling of the rear-wheel drive shaft 1.

A portion 31*j* at which the angle restriction stopper surface 31*i* and the cage stopper surface S meet forms a protruding corner portion in a longitudinal cross section containing a joint axis N-N. This configuration brings the angle restriction stopper surface 31*i* and the cage stopper surface S closer to each other to achieve simple and compact arrangements. Further, in terms of processing, shapes of the cage stopper surface S and the recessed portion 31*h* are roughly formed by forging of the outer joint member 31. Portions of the angle restriction stopper surface 31*i* and the recessed portion 31*h*, which are to avoid interference, are suitably formed by turning. It is preferred that the recessed portion 31*h* formed in the deep-side bottom portion 31*g* of the outer joint member 31 have a surface formed by forging and the angle restriction stopper surface 31*i* at the inner periphery of the recessed portion 31*h* have a surface formed by turning because reduction in processing man-hours and cost is achieved.

Next, several specific examples in which the dimensions and arrangements of the ball retaining mechanism M are adjusted are described with reference to FIG. 6 to FIG. 8. The internal specifications including the ratio $W1_o/D_{BALL}$ of the axial length $W1_o$ from the joint center to the opening-side end surface of the outer joint member to the diameter $D_{BALL}$ of each of the balls and the ratio $W_C/D_{BALL}$ of the width $W_C$ of the cage to the diameter $D_{BALL}$ of each of the balls are set so that the ratio $W1_o/D_{BALL}$ falls within the range of from 0.35 to 0.52 and the ratio $W_C/D_{BALL}$ falls within the range of from 1.63 to 1.80. In order to achieve reduction of the fixed type constant velocity universal joint in weight and size as a whole joint through the combination of the above-mentioned internal specifications, and the inclination allowing space K (cage stopper surface S) for the cage and the dimensions and arrangements of the ball retaining mechanism M, the angle restriction stopper surface 31*i* described above and the cage stopper surface S are positioned closer to each other to thereby achieve simple and compact arrangements. This idea is a key to conceive the dimensions and arrangements of the ball retaining mechanism M described later.

As a result of various examinations conducted based on the above-mentioned idea, the following configuration was found. Specifically, the end surface corner portion 4*c* of the cylindrical shaft portion 4*b* of the intermediate shaft 4, which is a part of the ball retaining mechanism M, is positioned within a range surrounded by a circle $C_C$ and a circle $C_T$ on the deep side of the outer joint member 31 in the longitudinal cross section containing the joint axis N-N under a state in which the operating angle is 0°. The circle $C_C$ contains the spherical outer peripheral surface 34*b* of the cage 34, and the circle $C_T$ contains groove bottoms of the curved track grooves 31*d* of the outer joint member 31. All the ball retaining mechanisms M illustrated in FIG. 6 to FIG. 8 comprise the above-mentioned common configuration.

For the ball retaining mechanism M illustrated in FIG. 6, an angle α defined by each straight line R that connects the joint center O and the end surface corner portion 4*c* of the cylindrical shaft portion 4*b* of the intermediate shaft 4 and the joint axis N-N is set to 13° in the longitudinal cross section containing the joint axis N-N under a state in which the fixed type constant velocity universal joint 3 forms the operating angle of 0°. In this specific example, dimensions and arrangements of the cage stopper surface S, the end surface corner portion 4*c* of the cylindrical shaft portion 4*b* of the intermediate shaft 4, and the angle restriction stopper surface 31*i* can be set with the largest margins. The angle restriction stopper surface 31*i* has an inner diameter corresponding to the restriction angle $\theta_{LIMIT}$ (for example, 25°).

For the ball retaining mechanism M illustrated in FIG. 7, the angle α defined by each straight line R that connects the joint center O and the end surface corner portion 4*c* of the cylindrical shaft portion 4*b* of the intermediate shaft 4 and the joint axis N-N is set to 10° in the longitudinal cross section containing the joint axis N-N under a state in which the fixed type constant velocity universal joint 3 forms the operating angle of 0°. The angle α of 10° is a lower limit in consideration of, for example, a machining center hole formed in the cylindrical shaft portion 4*b* of the intermediate shaft 4 and strength of the cylindrical shaft portion 4*b*. The inner diameter of the angle restriction stopper surface 31*i* is reduced correspondingly to the reduction in angle α.

For the ball retaining mechanism M illustrated in FIG. 8, the angle α defined by each straight line R that connects the joint center O and the end surface corner portion 4*c* of the cylindrical shaft portion 4*b* of the intermediate shaft 4 and the joint axis N-N is set to 17° in the longitudinal cross section containing the joint axis N-N under a state in which the fixed type constant velocity universal joint 3 forms the operating angle of 0°. The inner diameter of the angle restriction stopper surface 31*i* is increased correspondingly to the increase in angle α. Thus, in order to ensure the cage stopper surface S, the angle α of 17° is an upper limit.

As described above, it is preferred that the angle α defined by the straight line R that connects the joint center O and the end surface corner portion 4*c* of the cylindrical shaft portion 4*b* of the intermediate shaft 4 and the joint axis N-N be set to fall within a range of from 10° to 17° in the longitudinal cross section containing the joint axis N-N under a state in which the fixed type constant velocity universal joint 3 forms the operating angle of 0°.

The dimensions and arrangements of the end surface corner portion 4*c* of the cylindrical shaft portion 4*b* of the intermediate shaft 4, which is a part of the ball retaining mechanism M described above, are illustrated in FIG. 9 in a comprehensive manner. As is crosshatched in FIG. 9, it is preferred that the end surface corner portion 4*c* (not shown in FIG. 9) of the cylindrical shaft portion 4*b* of the intermediate shaft 4 be positioned within the range surrounded by the circle $C_C$ and the circle $C_T$ on the deep side of the outer joint member 31 in the longitudinal cross section containing the joint axis N-N under a state in which the operating angle is 0°. The circle $C_C$ contains the spherical outer peripheral surface 34*b* of the cage 34, and the circle $C_T$ contains the groove bottoms of the curved track grooves 31d of the outer joint member 31. It is also preferred that the angle α be set to fall within a range of from 10° to 17°. The above-mentioned configuration reduces the fixed type constant velocity universal joint 3 having the ball retaining mechanism M, which is to be used exclusively for a rear-wheel drive shaft, in weight and size as a whole joint at low cost.

The fixed type constant velocity universal joint 3 comprising the intermediate shaft 4 having a solid shape and the cylindrical shaft portion 4b formed integrally with the intermediate shaft 4 has been exemplified in this embodiment. However, the cylindrical shaft portion is not limited to that described above. For example, a component for forming a cylindrical shaft portion, which is separate from the intermediate shaft, may be, for example, fitted and fixed or welded and fixed to the intermediate shaft. Further, a shaft having a hollow shape may be used as the intermediate shaft, and a separate component for forming the cylindrical shaft portion may be, for example, fitted and fixed or welded and fixed to the intermediate shaft in the same manner as described above.

Figure 10:
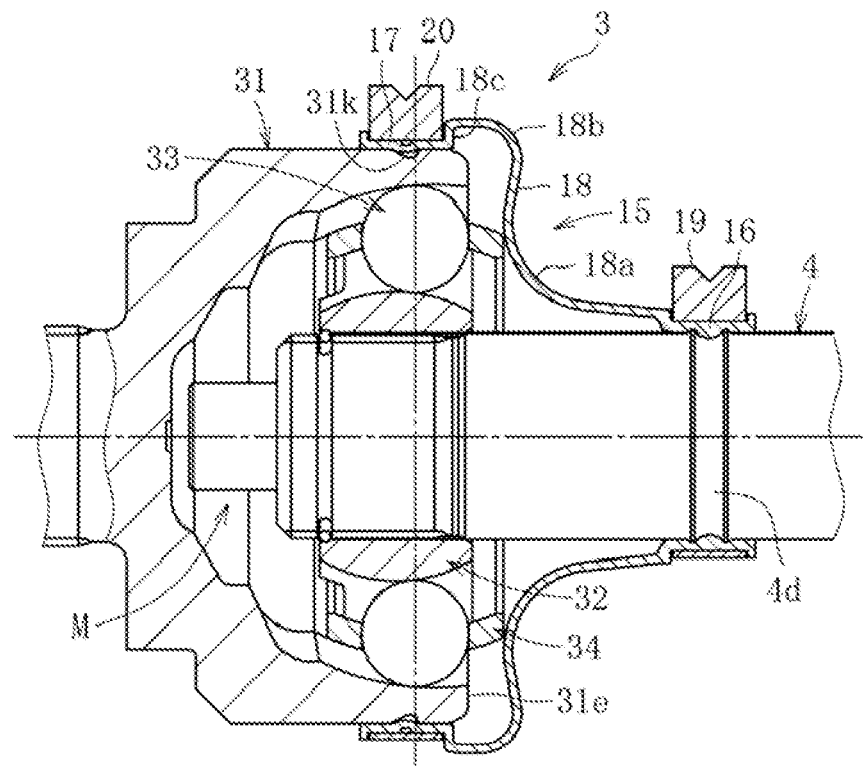
FIG. 10 is a longitudinal sectional view of the fixed type constant velocity universal joint onto which a boot is mounted under a state in which an operating angle is 0°.
Figure 11:
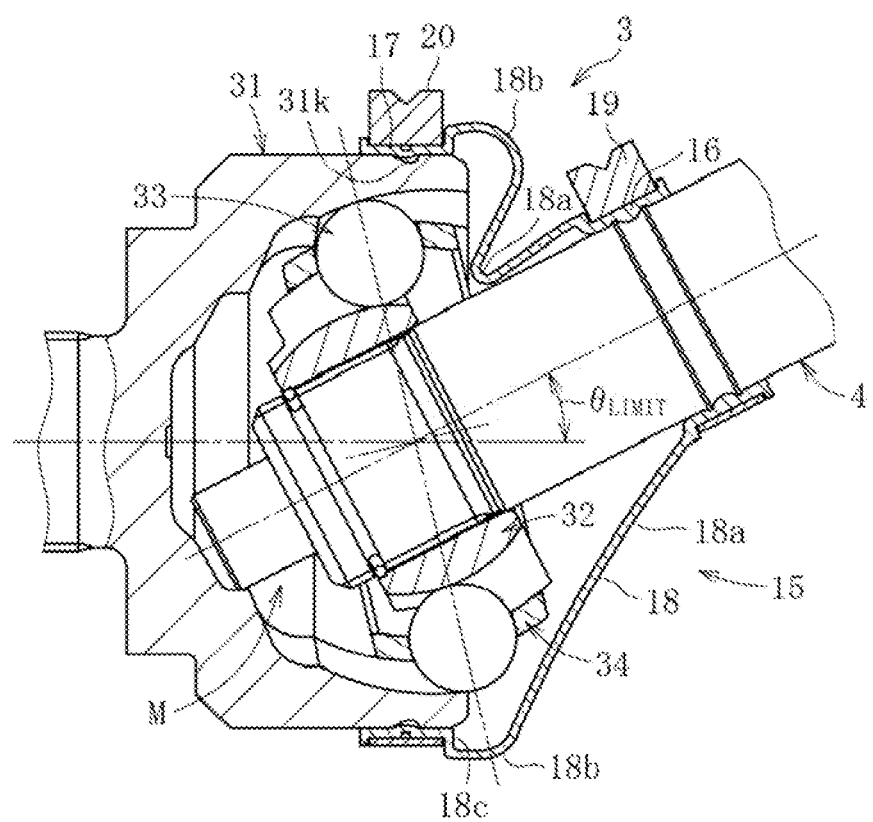
FIG. 11 is a longitudinal sectional view of the fixed type constant velocity universal joint onto which the boot is mounted when the fixed type constant velocity universal joint forms a restriction angle achieved by the ball retaining mechanism.

The boot 15 to be mounted onto the fixed type constant velocity universal joint 3 is described with reference to FIG. 10 and FIG. 11. FIG. 10 is a longitudinal sectional view of the fixed type constant velocity universal joint 3 onto which the boot 15 is mounted under a state in which the operating angle is 0°. FIG. 11 is a longitudinal sectional view for illustrating a state in which the restriction angle $\theta_{LIMIT}$ achieved by the ball retaining mechanism M is formed.

As illustrated in FIG. 10, the boot 15 comprises a small-diameter mounting portion 16, a large-diameter mounting portion 17, and a bent portion 18. The small-diameter mounting portion 16 is fitted and mounted in a boot mounting groove 4d at the outer periphery of the intermediate shaft 4. The large-diameter mounting portion 17 is fitted and mounted in a boot mounting groove 31k at the outer periphery of the outer joint member 31. The bent portion 18 couples the small-diameter mounting portion 16 and the large-diameter mounting portion 17 to each other. The bent portion 18 comprises a recessed curved portion 18a and a protruding curved portion 18b, and does not comprise a bellows portion. The recessed curved portion 18a is curved in a recessed manner with a diameter increasing in a direction from the small-diameter mounting portion 16 toward the large-diameter mounting portion 17. The protruding curved portion 18b is curved in a protruding manner, and is connected to the recessed curved portion 18a. The protruding curved portion 18b is connected to the large-diameter mounting portion 17 with a step portion 18c therebetween. The fixed type constant velocity universal joint 3 of this embodiment has an opening-side end portion of the cage 34, which protrudes beyond the opening-side end surface 31e of the outer joint member 31. The recessed curved portion 18a of the boot 15 is formed so that its inner surface is held in light contact with the opening-side end portion of the cage 34. The small-diameter mounting portion 16 is fitted and mounted in the boot mounting groove 4d at the outer periphery of the intermediate shaft 4, and is fastened and fixed by a boot band 19. The large-diameter mounting portion 17 is fitted and mounted in the boot mounting groove 31k at the outer periphery of the outer joint member 31, and is fastened and fixed by a boot band 20.

The boot 15 is made of a resin material having elasticity. For example, the boot 15 is formed by, for example, blow molding or injection molding using a thermoplastic elastomer material. A material for forming the boot 15 is not limited to a thermoplastic elastomer material, and materials used in the related art may be used.

As illustrated in FIG. 11, when the restriction angle $\theta_{LIMIT}$ to be achieved by the ball retaining mechanism M is formed, the bent portion 18 is deformed in a substantially linear manner on a tensile side (lower side in FIG. 11) of the boot 15. For the bent portion 18, a film length is set in consideration of the restriction angle $\theta_{LIMIT}$. Meanwhile, the recessed curved portion 18a of the bent portion 18 is deformed in a folded fashion on a compressive side (upper side in FIG. 11) of the boot 15. Thus, interference with the opening-side end portion of the cage 34 does not occur. The boot 15 does not have a bellows portion. However, the restriction angle $\theta_{LIMIT}$ (for example, about 25°) to be achieved by the ball retaining mechanism M is set. Thus, the boot can be prevented from being caught or stuck and coming off. As a result, reduction in size of the boot 15 and supply amount of grease can be achieved.

The fixed type constant velocity universal joint 3 onto which the boot 15 comprising the bent portion 18 without a bellows portion is mounted has been exemplified in this embodiment. However, the boot to be mounted onto the fixed type constant velocity universal joint is not limited to that described above. A boot comprising a bellows portion between the large-diameter mounting portion and the small-diameter mounting portion may be mounted. The bellows portion is formed by alternating peaks and troughs in the axial direction.

In this embodiment, heat treatment hardened layers are formed on surfaces of, for example, the track grooves 31d and the spherical inner peripheral surface 31c of the outer joint member 31, the inner joint member 32, and the cage 34, which are components of the fixed type constant velocity universal joint, to obtain strength and durability. However, an illustration and a description thereof are herein omitted.

Figure 12:
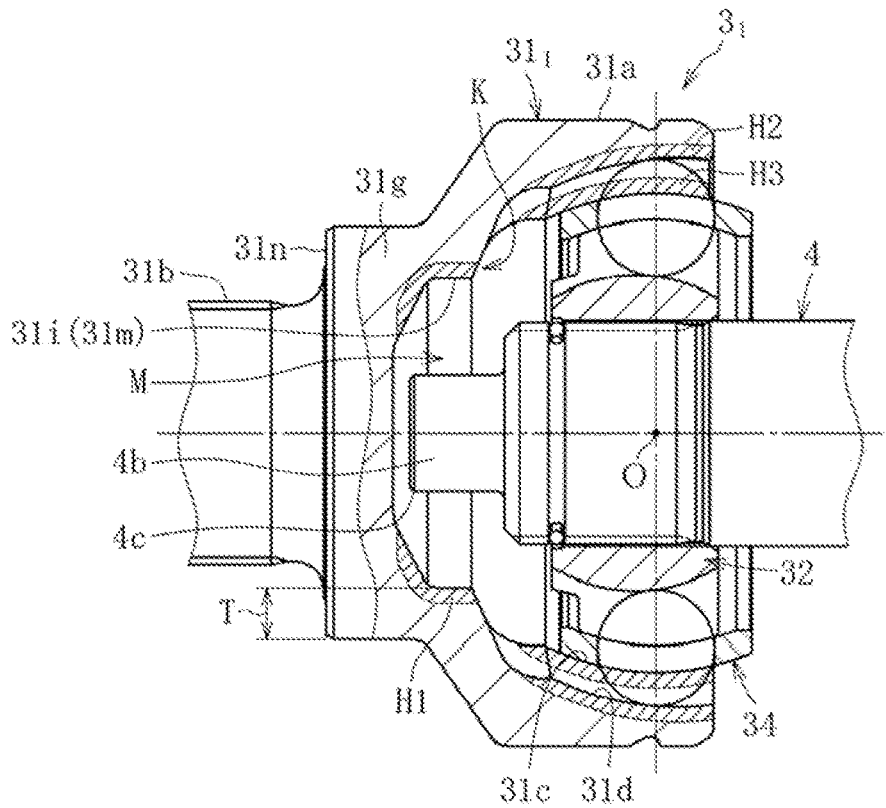
FIG. 12 is a longitudinal sectional view of a fixed type constant velocity universal joint according to a second embodiment.

Next, a fixed type constant velocity universal joint according to a second embodiment is described with reference to FIG. 12 and FIG. 13. FIG. 12 is a longitudinal sectional view of the fixed type constant velocity universal joint according to this embodiment, and FIG. 13 is a longitudinal sectional view of the fixed type constant velocity universal joint of FIG. 12 under a state in which the restriction angle achieved by the ball retaining mechanism is formed.

A fixed type constant velocity universal joint $3_1$ of this embodiment has the same internal specifications, the same inclination allowing space K for the cage, which is configured to ensure the ball incorporation angle, and the same ball retaining mechanism M as those of the above-mentioned fixed type constant velocity universal joint 3 of the first embodiment. However, the inclination allowing space K for a cage 34 of this embodiment does not have the cage stopper surface S against which an end surface corner portion 34c of the cage 34 abuts when the ball incorporation angle is formed. The ball incorporation angle is ensured through a gap of the inclination allowing space K for the cage 34. The fixed type constant velocity universal joint $3_1$ of this embodiment is different from the fixed type constant velocity universal joint 3 of the first embodiment in the following points. The fixed type constant velocity universal joint $3_1$ is the same as the fixed type constant velocity universal joint 3 of the first embodiment except for the following differences. Thus, the same components or parts having the same functions are denoted by the same reference symbols, and the description of the fixed type constant velocity universal joint 3 of the first embodiment is used therefor.

Figure 13:
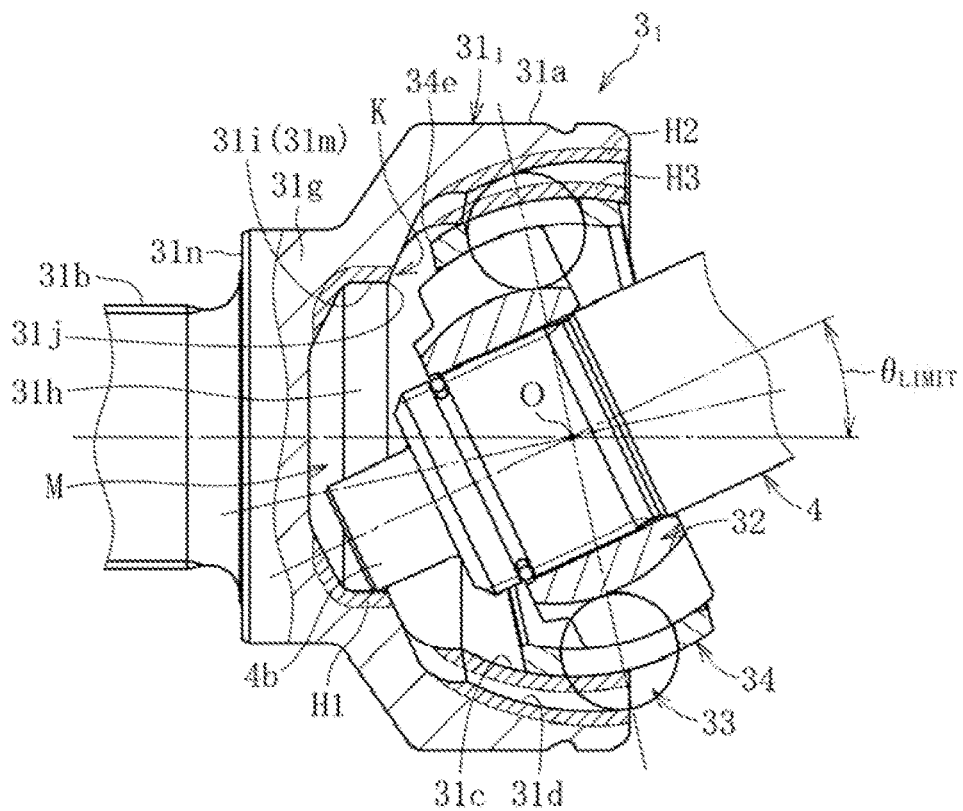
FIG. 13 is a longitudinal sectional view of the fixed type constant velocity universal joint illustrated in FIG. 12 when the fixed type constant velocity universal joint forms a restriction angle achieved by a ball retaining mechanism.

As illustrated in FIG. 12 and FIG. 13, a heat treatment hardened layer H1 is formed on an angle restriction stopper surface 31$i$ at an inner periphery of a recessed portion 31$h$ formed in a deep-side bottom portion 31$g$ of an outer joint member 31$_1$. The angle restriction stopper surface 31$i$ is a part of a ball retaining mechanism M. The heat treatment hardened layer H1 is densely hatched in FIG. 12 and FIG. 13. The ball retaining mechanism M is configured to restrict the angle through interference between a cylindrical shaft portion 4$b$ at an end portion of an intermediate shaft 4 and the angle restriction stopper surface 31$i$ at the inner periphery of the recessed portion 31$h$ formed in the deep-side bottom portion 31$g$. Thus, when the cylindrical shaft portion 4$b$ at the end portion of the intermediate shaft 4 has a constant outer diameter, the restriction angle θ$_{LIMIT}$ depends on a magnitude of an inner diameter of the recessed portion 31$h$. Thus, when the angle is desired to be restricted to a larger angle, a thickness of the deep-side bottom portion 31$g$ of the outer joint member 31$_1$ is reduced to affect strength. Accordingly, the angle cannot be set excessively large.

The fixed type constant velocity universal joint 3$_1$ of this embodiment has been reduced in size in the axial direction and the radial direction to achieve reduction in weight. In particular, the outer joint member 31$_1$ illustrated in FIG. 12 and FIG. 13 is designed so that a back face portion 31$n$, which serves as a processing reference at the time of processing of track grooves 31$d$ on an inner side of a mouth section 31$a$ having a cup shape and a spherical inner peripheral surface 31$c$, has a small outer diameter. As a result, a thin portion T is formed between the outer diameter surface of the back face portion 31$n$ and the angle restriction stopper surface 31$i$. A heat treatment is performed on an inner periphery of the thin portion T, specifically, the angle restriction stopper surface 31$i$ to form a hardened layer thereon. As a result, insufficient strength of the outer joint member 31$_1$ is compensated for, and the strength of the outer joint member 31$_1$ is maintained.

In contrast to the above-mentioned configuration, when the heat treatment hardened layer H1 is not formed on the inner periphery of the thin portion T and the restriction angle θ$_{LIMIT}$ is formed as illustrated in FIG. 13, the cylindrical shaft portion 4$b$ at the end portion of the intermediate shaft 4 may be brought into contact with the angle restriction stopper surface 31$i$ at the inner periphery of the recessed portion 31$h$ to leave a contact mark. Thus, an influence spreading from the contact mark on the strength of the outer joint member 31$_1$ may be a concern. Incidentally, a hub wheel (not shown) of a wheel bearing is mounted onto a stem section 31$b$ of the outer joint member 31$_1$, and a nut is threadably fitted over, fastened, and fixed to a threaded portion (see FIG. 1) at a shaft end of the stem section 31$b$. Thus, an axial force of the nut is constantly applied to the back face portion 31$n$ of the outer joint member 31$_1$. Thus, an influence spreading from the contact mark described above on the strength of the outer joint member 31$_1$ may be a concern.

The heat treatment hardened layer H1 formed on the inner periphery of the thin portion T of the angle restriction stopper surface 31$i$ of the ball retaining mechanism M ensures the strength of the outer joint member 31$_1$. Further, it also allows the inner diameter of the recessed portion 31$h$ (angle restriction stopper surface 31$i$) to be set larger to increase the restriction angle θ$_{LIMIT}$. Thus, a degree of freedom in design of the restriction angle θ$_{LIMIT}$ can be increased.

Induction hardening is performed on the surfaces of the track grooves 31$d$ in the inner periphery of the mouth section 31$a$ of the outer joint member 31$_1$ and the spherical inner peripheral surface 31$c$ to form heat treatment hardened layers H2 and H3. The heat treatment hardened layers H2 and H3 are densely hatched in FIG. 12 and FIG. 13. A hardness of each of the heat treatment hardened layers H2 and H3 is set to fall within a range of from about HRC 58 to about HRC 63. Meanwhile, it is preferred that a hardness of the heat treatment hardened layer H1 formed on the inner periphery of the thin portion T of the angle restriction stopper surface 31$i$ be set to about HRC 50, for example, within a range of from HRC 46 to HRC 54 in consideration of possibility of, for example, a quench crack in a corner of an end portion of the angle restriction stopper surface 31$i$ and burn-off in the thin portion T. Thus, the hardness of the heat treatment hardened layer H1 formed on the thin portion T of the angle restriction stopper surface 31$i$ is set lower than the hardness of each of the heat treatment hardened layers H2 and H3 formed on the track grooves 31$d$ and the spherical inner peripheral surface 31$c$ of the outer joint member 31$_1$, respectively. Now, the hardness of each of the heat treatment hardened layers H1, H2, and H3 is defined as "surface hardness." A hardness in this specification and the claims is used based on the definition described above.

A high-frequency heating coil for a heat treatment on the track grooves 31$d$ in the inner periphery of the mouth section 31$a$ and the spherical inner peripheral surface 31$c$ can be used for a heat treatment on the inner periphery of the thin portion T of the angle restriction stopper surface 31$i$ after being suitably adjusted and modified. As a result, the heat treatments on the track grooves 31$d$ in the inner periphery of the mouth section 31$a$ of the outer joint member 31$_1$, the spherical inner peripheral surface 31$c$, and the inner periphery of the angle restriction stopper surface 31$i$ can be simultaneously performed. Thus, heat treatment work can be shortened, and heat treatment cost can be reduced.

The fixed type constant velocity universal joint 3$_1$ of this embodiment having the same internal specifications, the same inclination allowing space K for the cage, which is configured to ensure the ball incorporation angle, and the same ball retaining mechanism M as those of the above-mentioned fixed type constant velocity universal joint 3 of the first embodiment has been exemplified. Thus, the fixed type constant velocity universal joint 3$_1$ having the ball retaining mechanism M, which is to be exclusively used for a rear-wheel drive shaft, can be reduced in weight and size as a whole joint at low cost. Further, a remarkable effect of ensuring the strength of the outer joint member 31$_1$ is obtained.

However, when the heat treatment hardened layer H1 is formed on the inner periphery of the angle restriction stopper surface 31$i$ in this embodiment, the strength of the outer joint member 31$_1$ is ensured. Further, the inner diameter of the recessed portion 31$h$ can be set large, and the restriction angle θ$_{LIMIT}$ can be increased. Thus, the advantage that the degree of freedom in design of the restriction angle θ$_{LIMIT}$ is increased can be obtained not only with the internal specifications of the above-mentioned fixed type constant velocity universal joint 3 of the first embodiment, the inclination allowing space K (cage stopper surface S) configured to ensure the ball incorporation angle, and the dimensions and arrangements of the ball retaining mechanism M but also with the internal specifications and the dimensions and arrangements that are suitably adjusted or changed within a practicable range. The heat treatment hardened layer H1 can be formed not only on a cylindrical surface portion 31m of the angle restriction stopper surface 31i but also on a suitable region such as a bottom portion of the recessed portion 31h.

Figure 14:
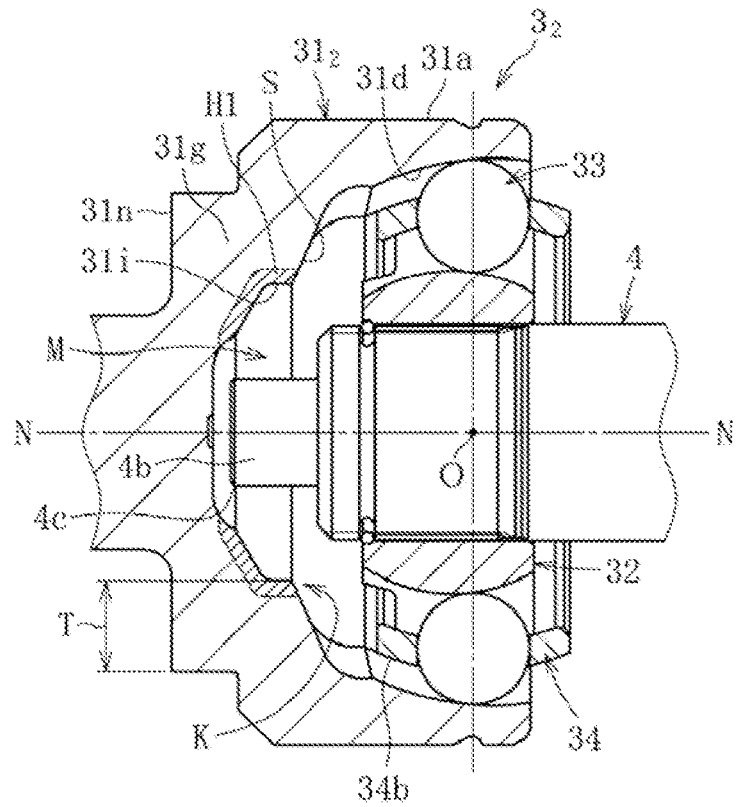
FIG. 14 is a longitudinal sectional view of a modification example of the fixed type constant velocity universal joint according to the second embodiment.
Figure 15:
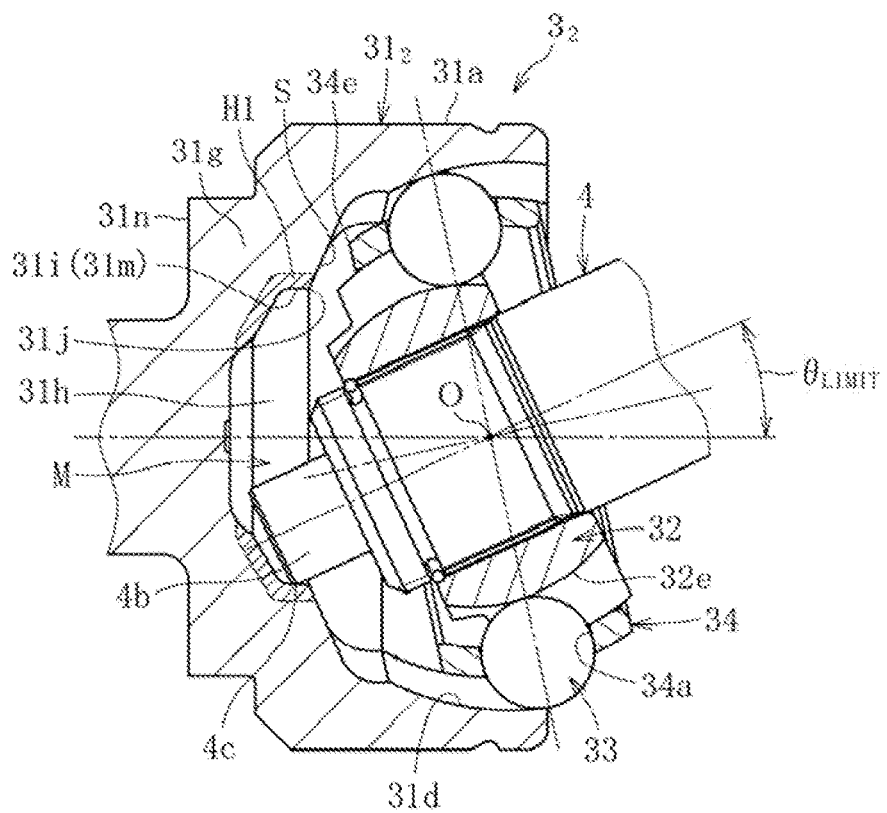
FIG. 15 is a longitudinal sectional view of the fixed type constant velocity universal joint illustrated in FIG. 14 when the fixed type constant velocity universal joint forms a restriction angle achieved by a ball retaining mechanism.

A modification example of the fixed type constant velocity universal joint $3_1$ of the second embodiment is illustrated in FIG. 14 and FIG. 15. A fixed type constant velocity universal joint $3_2$ of this modification example is designed so as to have the same outer-diameter dimension of a back face portion 31n and the same shape of a deep-side bottom portion 31g of an outer joint member $31_2$ as those of the outer joint member 31 of the first embodiment. When the fixed type constant velocity universal joint $3_2$ of this modification example forms the ball incorporation angle, an end surface corner portion 34c of a cage 34 abuts against a cage stopper surface S. The fixed type constant velocity universal joint $3_2$ of this embodiment is different from the fixed type constant velocity universal joint 3 of the first embodiment in the following points. The fixed type constant velocity universal joint $3_2$ is the same as the fixed type constant velocity universal joint 3 of the first embodiment except for the following differences. Thus, the same components or parts having the same functions are denoted by the same reference symbols, and the description of the fixed type constant velocity universal joint 3 of the first embodiment is used therefor. Further, the description of the fixed type constant velocity universal joint $3_1$ of the second embodiment is used therefor.

A heat treatment hardened layer H1 is formed on an inner periphery of an angle restriction stopper surface 31i of the outer joint member $31_2$ in this modification example. Also in this modification example, induction hardening is performed on track grooves 31d and a spherical inner peripheral surface 31c on an inner periphery of a mouth section 31a of the outer joint member $31_2$ to form heat treatment hardened layers H2 and H3 thereon. However, an illustration thereof is herein omitted.

The fixed type constant velocity universal joint $3_2$ of this modification example having the same internal specifications, the same inclination allowing space K (cage stopper surface S) for the cage, which is configured to ensure the ball incorporation angle, and the same ball retaining mechanism M as those of the above-mentioned fixed type constant velocity universal joint 3 of the first embodiment has been exemplified. Thus, the fixed type constant velocity universal joint $3_2$ having the ball retaining mechanism M, which is to be exclusively used for a rear-wheel drive shaft, can be reduced in weight and size as a whole joint at low cost. Further, a remarkable effect of ensuring the strength of the outer joint member $31_2$ is obtained.

However, when a heat treatment hardened layer is formed on the inner periphery of the angle restriction stopper surface 31i in this embodiment, the strength of the outer joint member $31_2$ is ensured. Further, the inner diameter of the recessed portion 31h can be set large, and the restriction angle $\theta_{LIMIT}$ can be increased. Thus, the advantage that the degree of freedom in design of the restriction angle $\theta_{LIMIT}$ is increased can be obtained not only with the internal specifications of the above-mentioned fixed type constant velocity universal joint 3 of the first embodiment, the inclination allowing space K (cage stopper surface S) configured to ensure the ball incorporation angle, and the dimensions and arrangements of the ball retaining mechanism M but also with the internal specifications and the dimensions and arrangements that are suitably adjusted or changed within a practicable range.

The present invention is not limited to the above-mentioned embodiments. As a matter of course, the present invention may be carried out in various modes without departing from the spirit of the present invention. The scope of the present invention is defined in claims, and encompasses equivalents described in claims and all changes within the scope of claims.

DESCRIPTION OF REFERENCE SIGNS 1 rear-wheel drive shaft
3 fixed type constant velocity universal joint
4 intermediate shaft
4a spline
4b cylindrical shaft portion
4c end surface corner portion
15 boot
18 bent portion
18a recessed curved portion
31 outer joint member
31c spherical inner peripheral surface
31d track groove
31g deep-side bottom portion
31h recessed portion
31i angle restriction stopper surface
31j protruding corner portion
32 inner joint member
32d spherical outer peripheral surface
32e track groove
33 ball
34 cage
34b spherical outer peripheral surface
34c spherical inner peripheral surface
$C_C$ circle containing spherical outer peripheral surface of cage
$C_T$ circle containing groove bottoms of curved track grooves of outer joint member
$D_{BALL}$ diameter of ball
H1 heat treatment hardened layer
H2 heat treatment hardened layer
H3 heat treatment hardened layer
K inclination allowing space for cage
M ball retaining mechanism
N joint axis
O joint center
R straight line that connects joint center and end surface corner portion of cylindrical shaft portion of intermediate shaft
S cage stopper surface
$W1_o$ axial length from joint center to opening-side end surface of outer joint member
$W_C$ cage width
α angle defined by straight line R and joint axis

The invention claimed is:

1. A fixed type constant velocity universal joint, comprising:
an outer joint member including a spherical inner peripheral surface having eight curved track grooves extending in an axial direction, the outer joint member having an opening side and a deep side being separate from each other in the axial direction;
an inner joint member including a spherical outer peripheral surface having eight curved track grooves extending in the axial direction;
eight balls each arranged between one of the curved track grooves of the outer joint member and a corresponding one of the curved track grooves of the inner joint member;

a cage, which has eight pockets configured to receive the balls in a one-by-one manner, and includes a spherical outer peripheral surface and a spherical inner peripheral surface that are held in slide contact with the spherical inner peripheral surface of the outer joint member and the spherical outer peripheral surface of the inner joint member, respectively;

a shaft coupled to the inner joint member to be able to transmit power; and a ball retaining mechanism, wherein a curvature center of the curved track grooves of the outer joint member and a curvature center of the curved track grooves of the inner joint member are offset to opposite sides in the axial direction with respect to a joint center by an equal distance, wherein a ratio $W1_o/D_{BALL}$ of an axial length ($W1_o$) from the joint center to an opening-side end surface of the outer joint member to a diameter ($D_{BALL}$) of each of the balls is set to fall within a range of from 0.35 to 0.52, wherein a ratio $W_C/D_{BALL}$ of a width ($W_C$) of the cage to the diameter ($D_{BALL}$) of each of the balls is set to fall within a range of from 1.63 to 1.80, wherein an inclination allowing space for the cage, which is configured to ensure a ball incorporation angle, is defined by a deep-side bottom portion of the outer joint member, wherein the ball retaining mechanism comprises a cylindrical shaft portion formed at an end portion of the shaft and an angle restriction stopper surface at an inner periphery of a recessed portion formed in the deep-side bottom portion, and the cylindrical shaft portion and the angle restriction stopper surface interfere with each other at an angle smaller than the ball incorporation angle, and wherein an end surface corner portion of the cylindrical shaft portion of the shaft is positioned within a range surrounded by a circle ($C_C$) containing the spherical outer peripheral surface of the cage and a circle ($C_T$) containing groove bottoms of the curved track grooves of the outer joint member on the deep side of the outer joint member in a longitudinal cross section containing a joint axis under a state in which an operating angle is 0°.

2. The fixed type constant velocity universal joint according to claim 1, wherein the inclination allowing space for the cage, which is defined by the deep-side bottom portion of the outer joint member and is configured to ensure the ball incorporation angle, has a cage stopper surface.

3. The fixed type constant velocity universal joint according to claim 2, wherein the angle restriction stopper surface comprises a cylindrical surface portion having the joint axis as a center axis, and a portion at which the angle restriction stopper surface and the cage stopper surface meet forms a projecting corner portion in a longitudinal cross section containing the joint axis.

4. The fixed type constant velocity universal joint according to claim 1, wherein an angle ($\alpha$) defined by a straight line (R) that connects the joint center (O) and the end surface corner portion of the cylindrical shaft portion of the shaft and the joint axis is set to fall within a range of from 10° to 17° in a longitudinal cross section containing the joint axis under a state in which the fixed type constant velocity universal joint forms an operating angle of 0°.

5. The fixed type constant velocity universal joint according to claim 1, wherein the recessed portion formed in the deep-side bottom portion of the outer joint member has a surface formed by forging, and the angle restriction stopper surface at the inner periphery of the recessed portion has a surface formed by turning.

6. The fixed type constant velocity universal joint according to claim 1, further comprising a resin boot without a bellows portion mounted to cover a region between the outer joint member of the fixed type constant velocity universal joint and the shaft.

7. The fixed type constant velocity universal joint according to claim 1, wherein a heat treatment hardened layer is formed on the angle restriction stopper surface of the ball retaining mechanism.

8. The fixed type constant velocity universal joint according to claim 7, wherein a hardness of the heat treatment hardened layer formed on the angle restriction stopper surface is lower than a hardness of each of heat treatment hardened layers formed on the curved track grooves and the spherical inner peripheral surface of the outer joint member.

* * * * *